United States Patent Office 2,989,777
Patented June 27, 1961

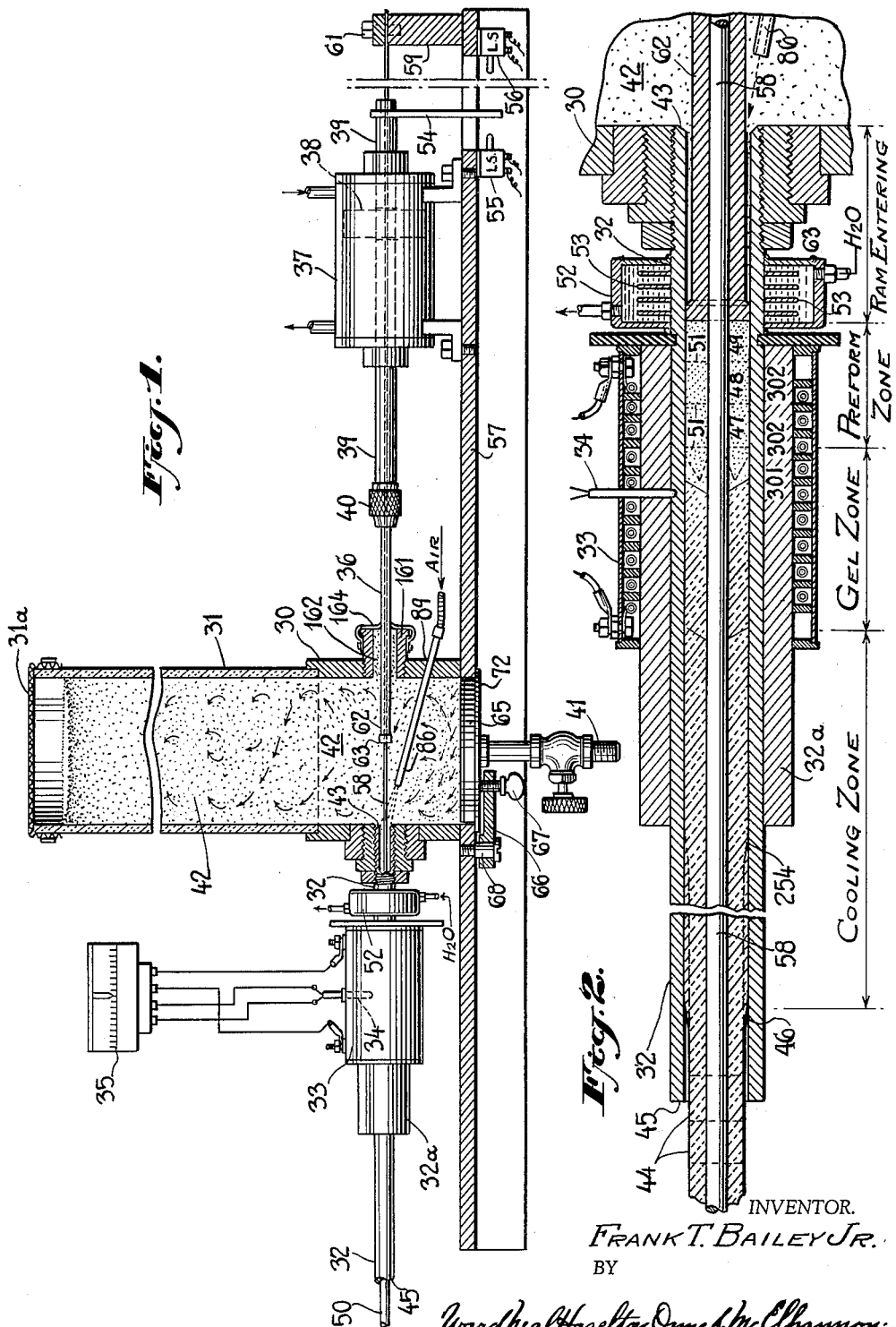

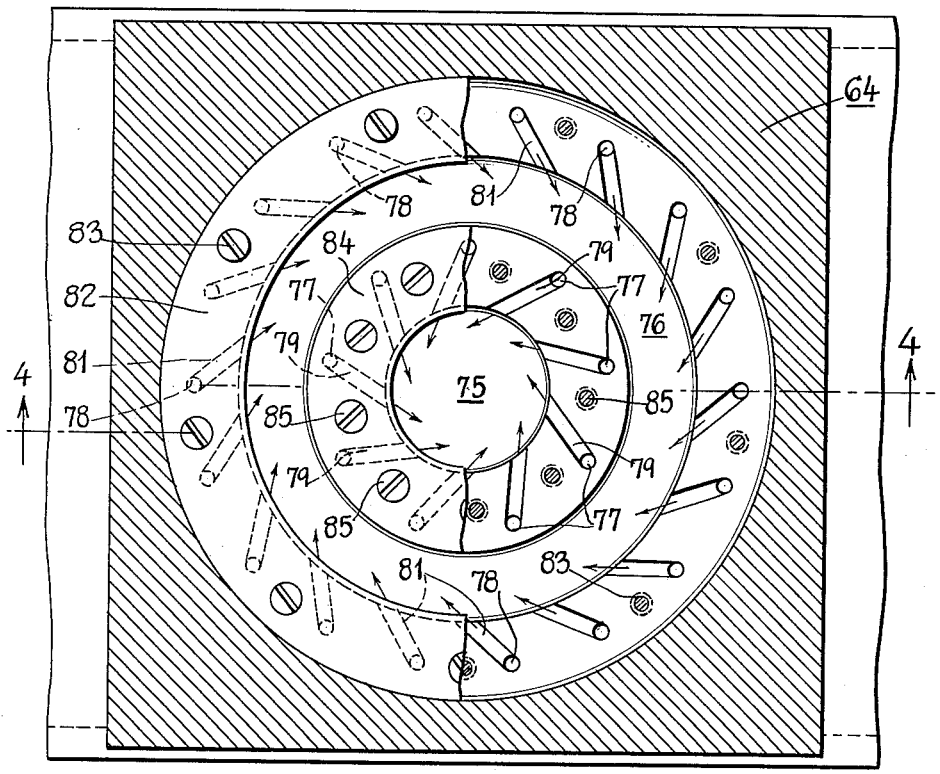
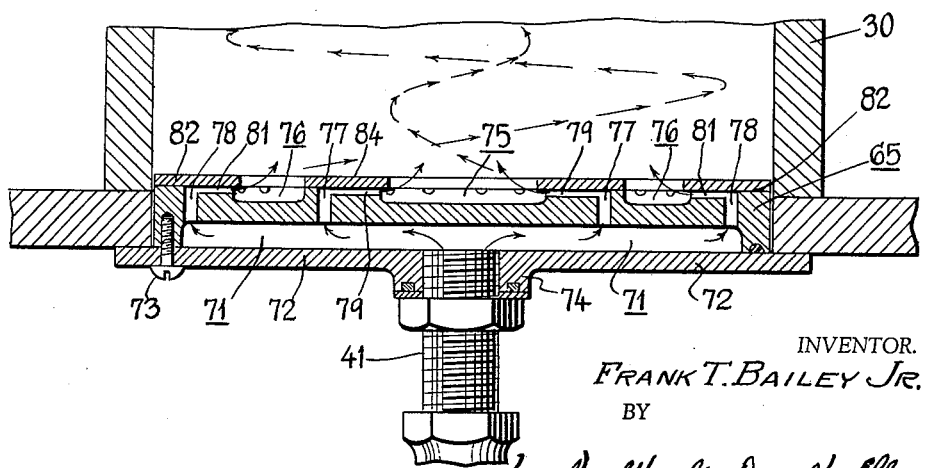

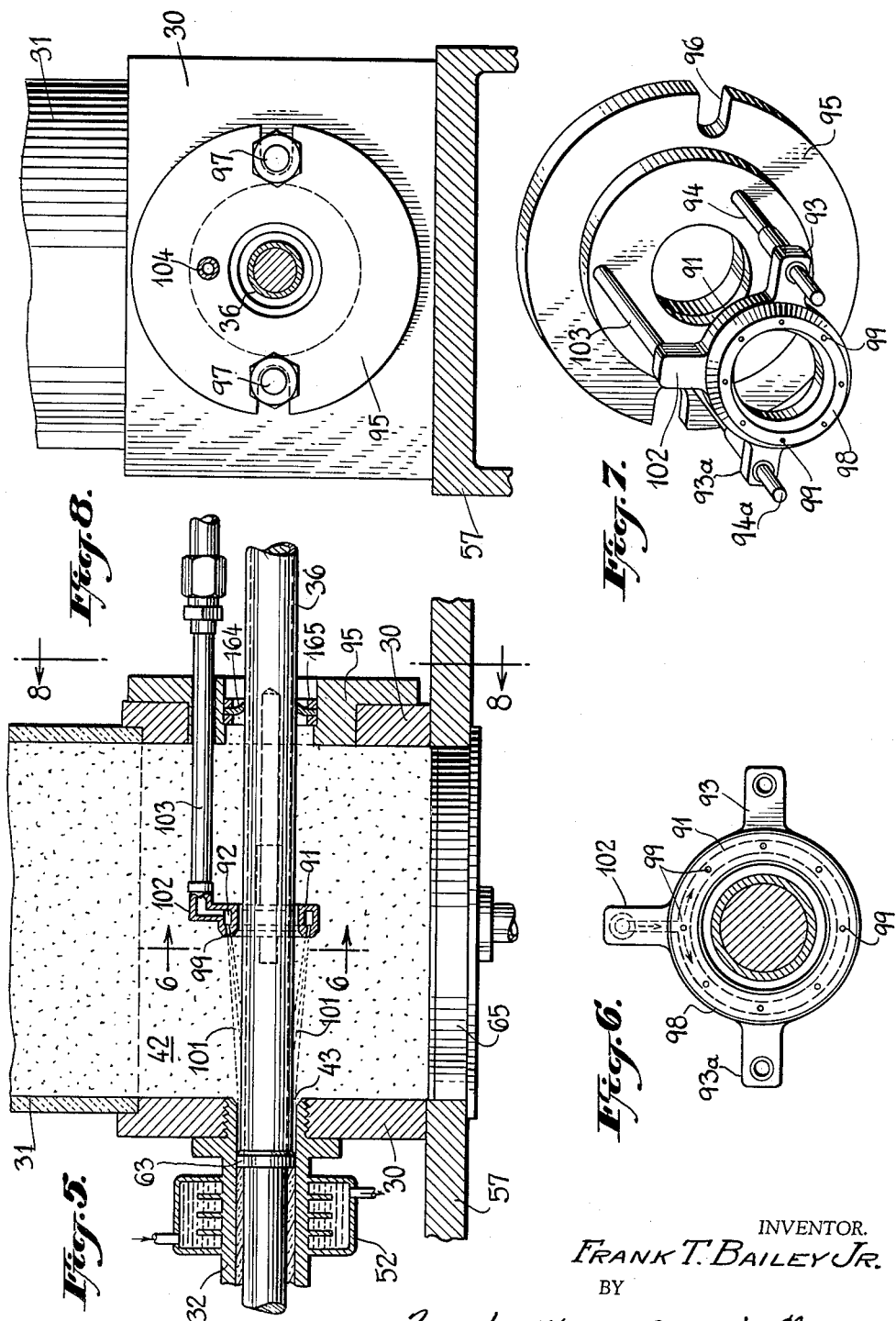

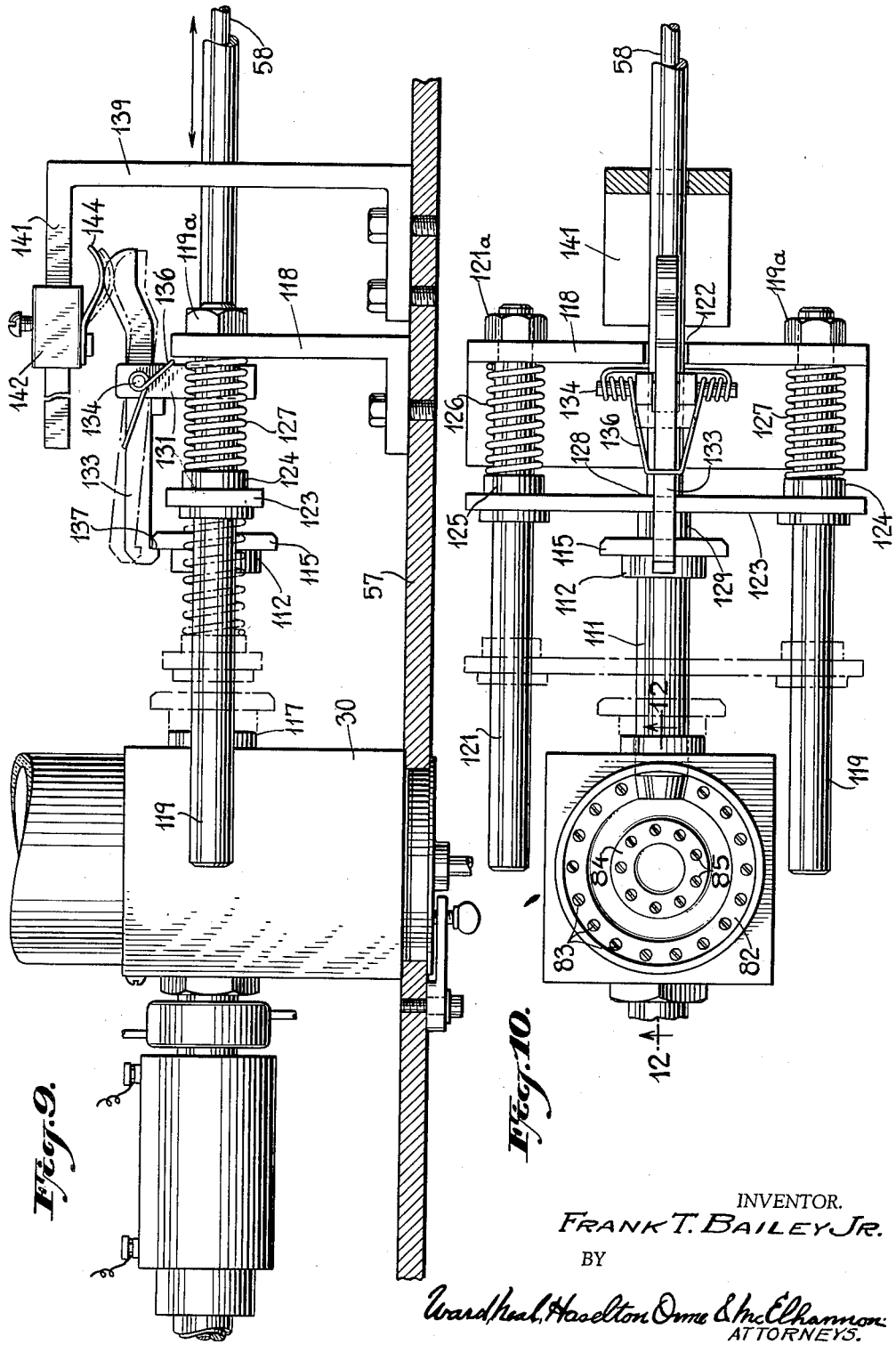

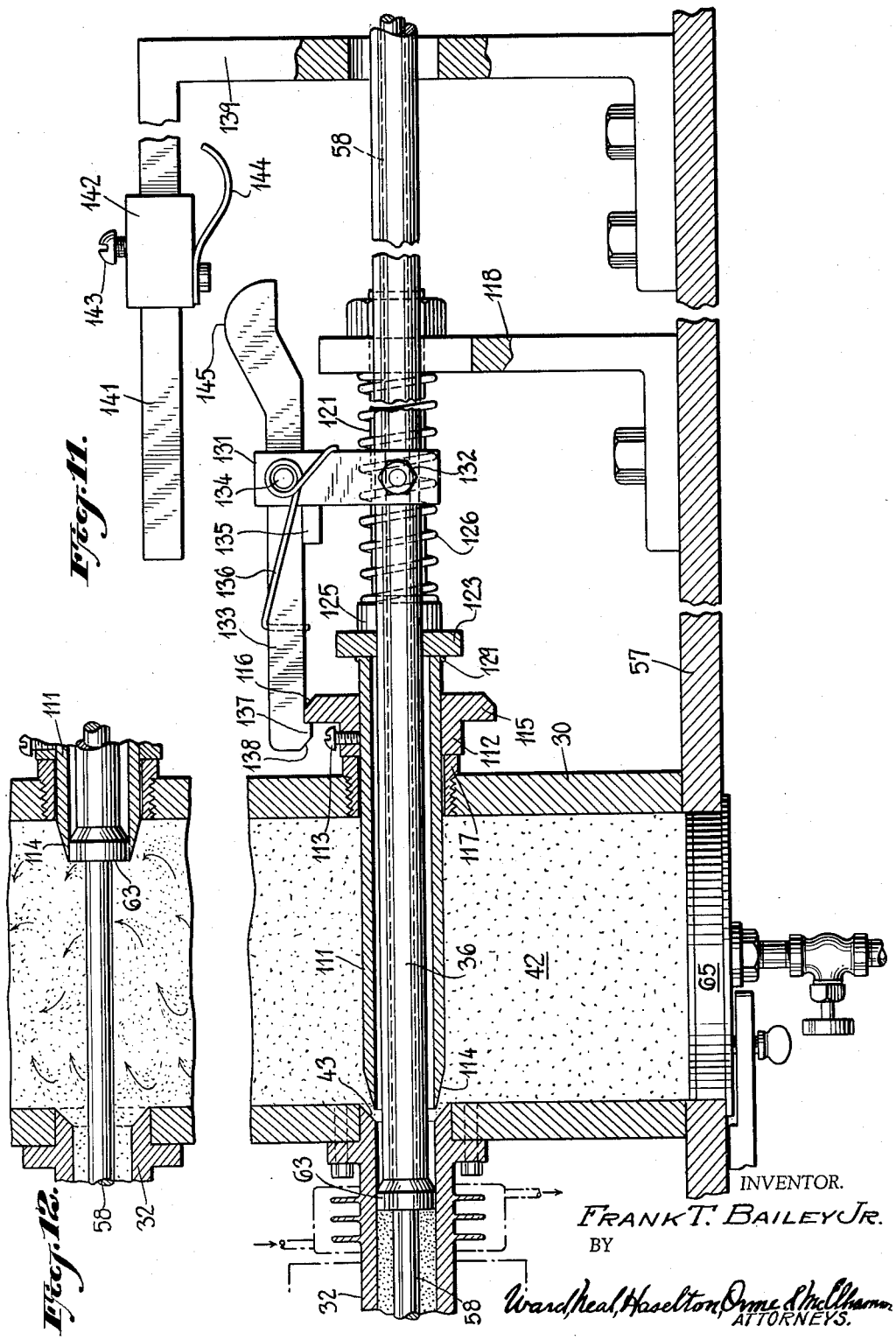

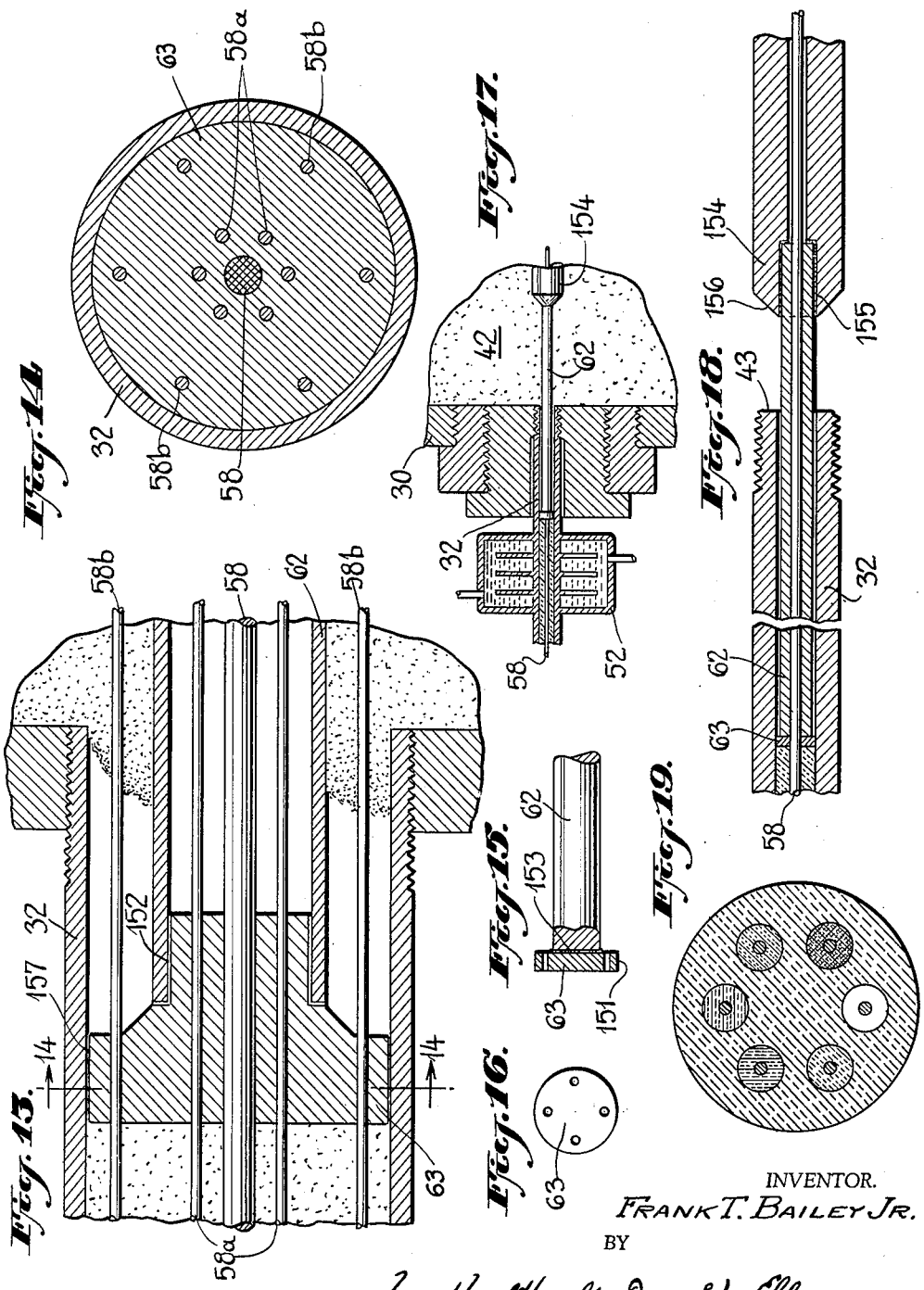

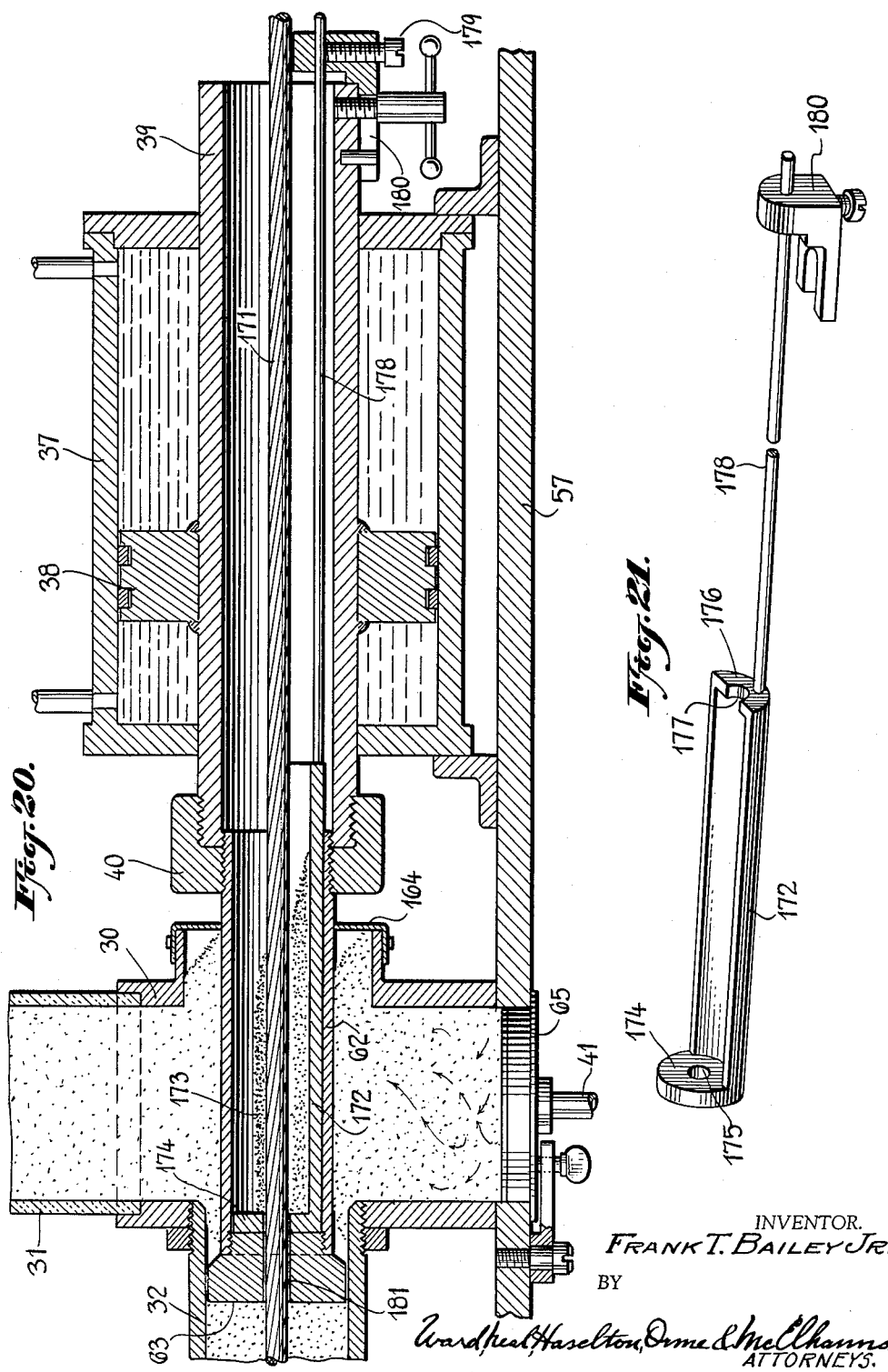

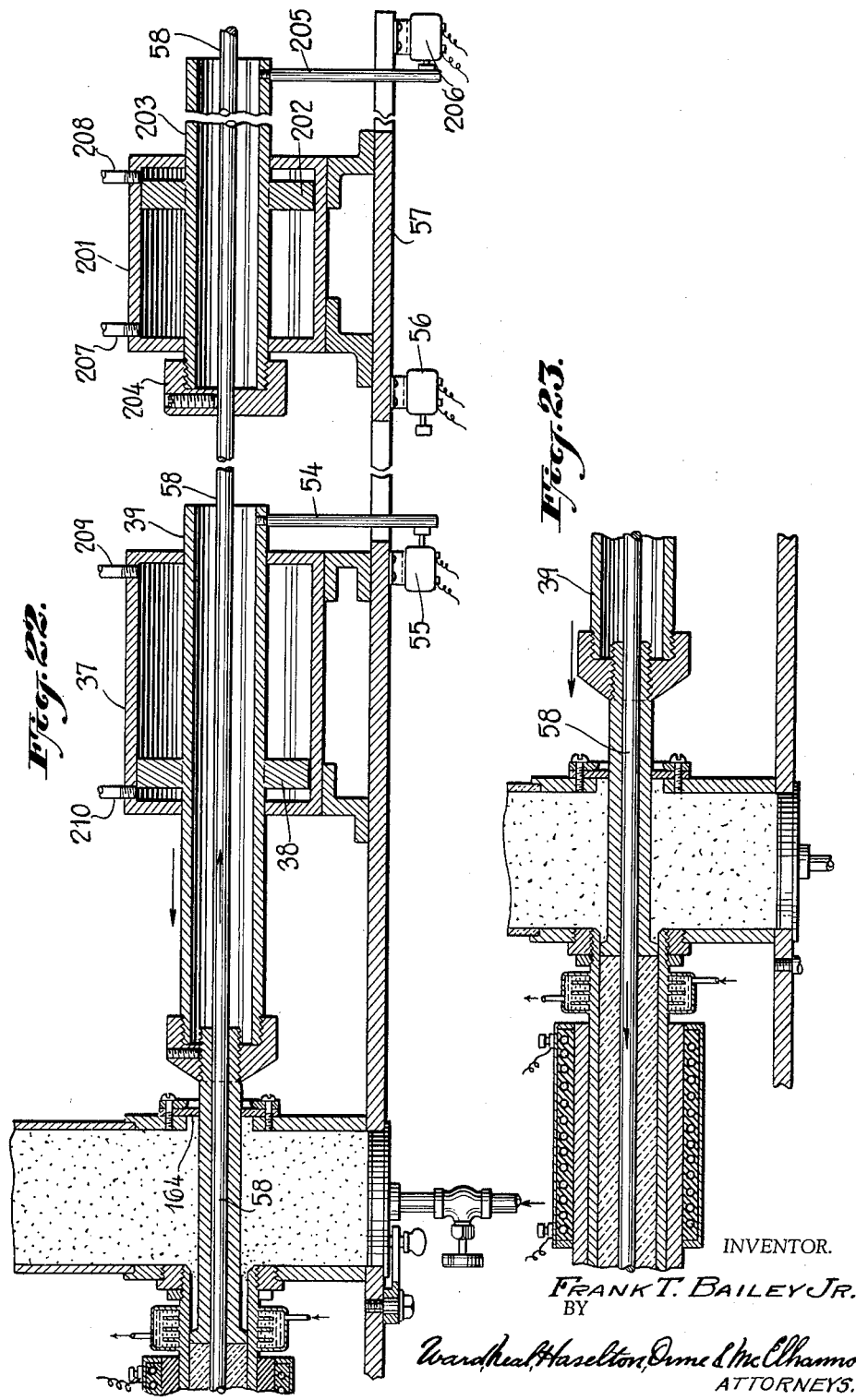

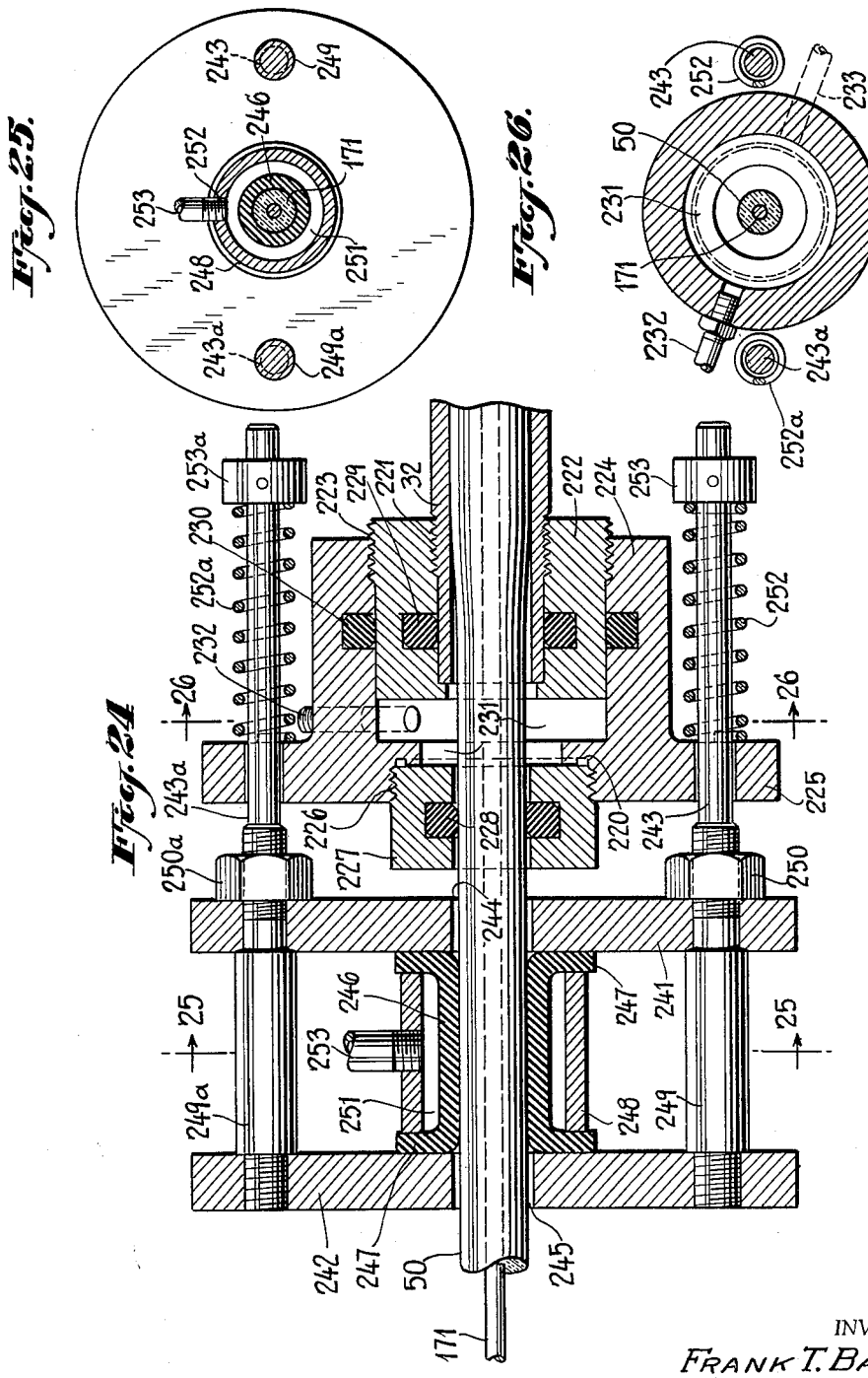

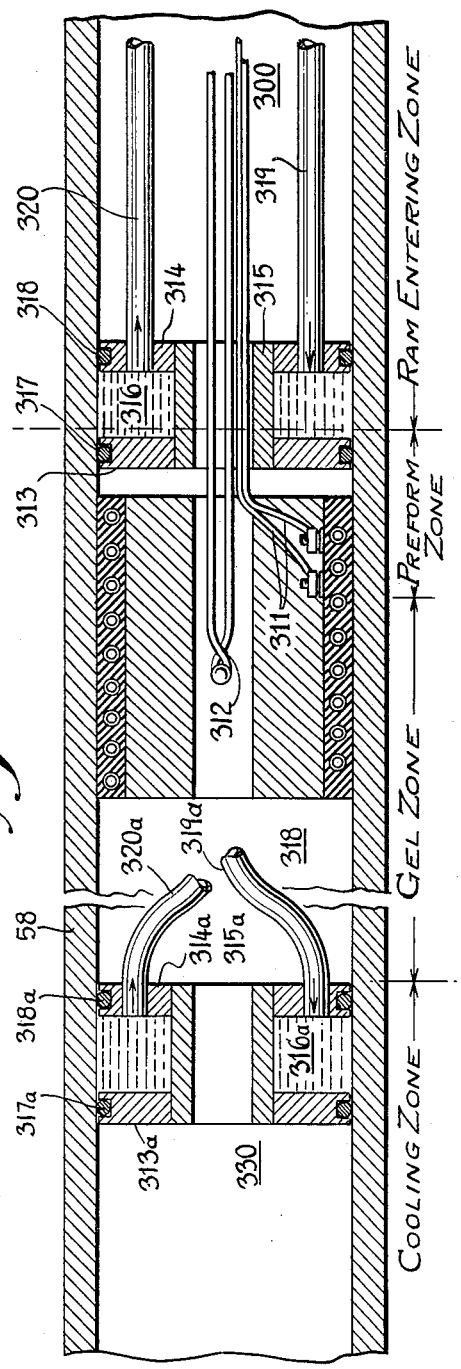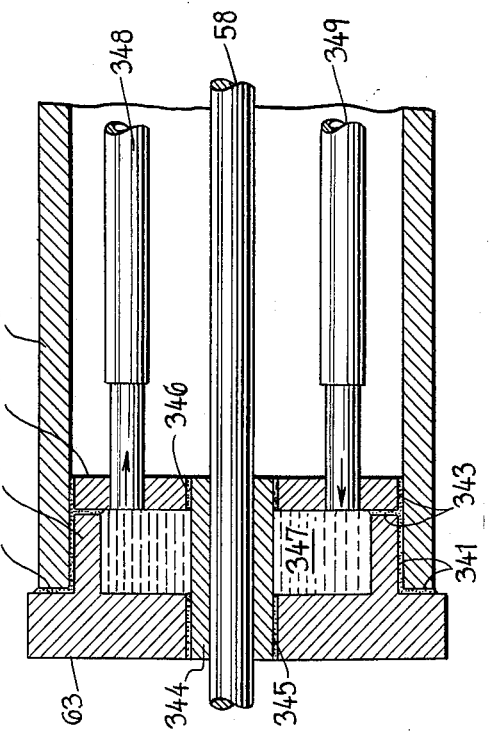

2,989,777
DRY POWDER EXTRUDING APPARATUS AND METHODS FOR PRODUCING POLYTETRAFLUOROETHYLENE ARTICLES
Frank T. Bailey, Jr., Westhampton Beach, N.Y., assignor to Surf Chemical Inc., Harrison, N.J., a corporation of New Jersey
Filed June 4, 1957, Ser. No. 666,263
23 Claims. (Cl. 18—12)

This invention relates to methods and apparatus for the production of plastic articles by ram extrusion of dry finely divided plastic material. More particularly, it relates to methods and apparatus for producing polytetrafluoroethylene articles by dry powder ram extrusion.

The properties of polytetrafluoroethylene resins referred to hereinafter as Du Pont's "Teflon" are well known. While the resin is classed as thermoplastic, it does not melt as most materials, but rather its normal crystalline structure changes to an amorphous, transparent gel above about 620° F. The material has exceptional thermal stability and is suitable for service from above 500° to as low as −450° F. It is tough, relatively flexible, has appreciable elasticity, has a coefficient of friction well below such materials as graphite and molybdenum disulphide, is non-adhesive, chemically inert, and does not absorb moisture. Perhaps most important, "Teflon" has exceptional electrical properties, among which are excellent arc-resistance which remains substantially unchanged up to 400° F. over a wide frequency range. Its unique dielectric, thermal and mechanical properties dictate its use extensively as an electrical insulator.

The material was initially applied in the form of tape as insulating coating for wire, since initial attempts to extrude the material over wire were not particularly successful. In recent years, however, extrusion techniques have been developed whereby a thin coating on wire is possible. The method in most general use today is termed "paste extrusion." Very finely divided "Teflon" is mixed with a volatile lubricant or extrusion aid, such as naphtha, to form a paste, which is then preformed and subsequently forced by means of a ram into a forming die through which passes the wire to be coated. The lubricant is then volatilized at between 200° and 575° F., with care being taken so that the rate of volatilization is sufficiently slow to prevent bubbling. Generally, the lubricant is an inflammable material which creates a safety hazard and of course requires adequate ventilation. When the lubricant has been volatilized, the extruded article is then heated above gelation temperature. Heating is to between about 720° and 750° F. for a time sufficient to cause the particles to completely coalesce, after which the material is carefully cooled to avoid uneven density.

The most serious drawback in paste extrusion is the fact that only a relatively thin coating can be applied to the wire. If the wall thickness is substantial, bubbles are formed adjacent the inner wall during even the most careful volatilization of the lubricant, thus producing void spaces in the material which are not closed during subsequent coalescence. The result is a sintered product to the eye having a continuous and regular surface, but which is, because of the voids, electrically porous. Furthermore, the paste extrusion apparatus is complex due in part to the requirement that the lubricant be volatilized before the Teflon is raised to gelation temperatures, and a single machine requires a considerable capital expenditure. In addition, the starting powder and lubricant paste is much more costly than an equivalent unit of dry, finely divided Teflon powder.

The material in the form of dry powder may also be extruded by means of a screw or a reciprocating ram and it is possible by the dry method to produce substantially thicker coatings on wire, for example. The basic ram extrusion device which has been used with very limited success, includes a hopper for the finely divided powder, a horizontally disposed die adjoining the hopper at its base, and usually integral with the hopper, and a ram which passes through the side of the hopper and into the die. An air cylinder with associated pneumatic system is employed for actuating reciprocation of the ram. The die is also heated, preferably by means of band type resistance heaters, to above coalescing temperature, generally between about 670° and 770° F. The basic apparatus includes a compressed air jet in the base of the hopper or in the wall of the die just below the hopper to direct a stream of air upwardly through the hopper thus breaking up any lumps of powder before it enters the die. The supply of compressed air to this jet is intermittent and timed with the position of the ram. Solid articles of any desired cross-sectional shape may be produced by simply inserting a die of the desired cross-sectional configuration and extruding thereinto. Alternatively, a mandrel may be positioned within the die with the ram adapted to accommodate the same if it is desired to produce tubing.

With the basic horizontal extruding device just described, uniform feeding of the powder to the die is for all practical purposes impossible, which accounts for its lack of commercial acceptance. The individual particles of Teflon adhere to one another, and the powder has a very high angle of repose. Thus the ram passing through the powder pushes an uneven pyramid of material into the die. In the production of tubing for example and particularly thin wall tubing, uniform feeding over the cross-section of the die is essential, for reasons which will be set forth hereinafter, and such uniform feeding is not possible in the basic horizontally disposed apparatus.

In order to overcome the feeding problem, apparatus has been developed in which the die and ram are disposed vertically in order to take advantage of a gravity feed. A feeding ring is positioned above the feed end of the die, designed so as to distribute the powder evenly around the mandrel where tubing is being extruded, thus theoretically providing a uniform charge of powder to the die. Powder is vibrated from a hopper onto an inclined vibrating feeder device which urges the material onto the feeding ring. While feeding in the vertical apparatus is definitely more satisfactory than in the basic horizontal extruder, the vibrating apparatus employed to supply powder to the feeder ring does not adequately break up agglomerates. Thus it is necessary for an operator to stand by the feeding apparatus and break up or remove chunks of powder before the same reach the feeder ring, and even so feeding is slow and not uniform.

The vertical ram extruder while capable of producing more uniform articles, particularly tubing, than the basic horizontal apparatus is open to the further objection that from two to three stories of a building are required to house the apparatus and product takeup device.

The basic horizontal ram extruder and its vertically arranged counterpart are discussed in some detail in E. I. du Pont de Nemours publication entitled "Teflon Tetrafluoroethylene Resin," copyright 1955, and Information Bulletin No. X–52a, entitled "Teflon Tetrafluoroethylene Resin Ram Extrusion" dated November 15, 1954.

The present invention is directed primarily to improvements in the basic horizontal ram extruding apparatus whereby it is now possible commercially to produce shapes, tubes, or to coat solid articles with "Teflon" thus producing a more uniform product than heretofore, and in the case of wire coating, to produce a product which has superior electrical properties. Basically, the improvements comprise an aerator in the base of the powder hopper for producing a violent storm of "Teflon" particles thus completely lubricating the powder with air and assuring complete breakup of powder agglomerates. Means are also provided intermediate the hopper and the heating element surrounding the die for arresting migration of heat along the die in the direction of the hopper, thereby permitting compacting of the powder within the die at temperatures substantially lower than heretofore. The invention further provides novel ram tip and shank design permitting more efficient extrusion and reducing to a minimum the occurrence of imperfections due to the presence of smeared particles of "Teflon" in the finished article. Means are also provided for passage of the ram shank through the rear wall of the hopper so as to avoid the formation of smeared particles, which are likely to enter the material in the hopper and subsequently the finished product. The present invention also provides stripping means positioned within the shank of the ram, when the apparatus is being operated to coat wire, for easy removal of powder which has flashed back through the perforation in the tip into the hollow shank of the ram. In addition, positive die feeding or preloading means are provided. The present invention also provides means for retracting the mandrel when the apparatus is employed to produce tubing, thereby speeding up the extrusion operation and further contributing to a uniform tubular product. Furthermore, means including a brake and pressure seal are provided beyond the exit end of the die for controlling certain factors in the extrusion operation thus contributing to improved product quality.

In addition to the aforementioned improvements in the basic horizontal extruding apparatus, the present invention also provides improved methods for the dry powder ram extrusion of "Teflon" which produce a more uniform product than has been possible heretofore, whether shape, tube or coated wire. Still further, the present invention provides a method for producing electrically non-porous "Teflon" articles and coatings by ram extrusion of reclaimed "Teflon," which until this time had not been possible.

In the drawings:

FIG. 1 is an elevation partly in section of the extruding apparatus of the present invention;

FIG. 2 is an enlarged section through a portion of the die, and adjacent structures with the ram at the forward end of its stroke, illustrating the "Teflon" preform, gel, and cooling zones within the die, as well as that portion of the die which is termed the ram entering zone;

FIG. 3 is a plan view with a portion thereof broken away of interior of the hopper illustrating the aerator or gas distributor;

FIG. 4 is a vertical section taken on lines 4—4 of FIG. 3;

FIG. 5 is a vertical section through the powder hopper and injector die preloader therein;

FIG. 6 is a vertical section taken on the lines 6—6 of FIG. 5;

FIG. 7 is a perspective view of the preloading injector of FIGS. 5 and 6 positioned on the rear face plate of the powder hopper;

FIG. 8 is a side elevation of the hopper and ram face plate;

FIG. 9 is an elevation of a mechanical die preloading device;

FIG. 10 is a plan view of the device of FIG. 9;

FIG. 11 is a vertical section of the apparatus of the mechanical preloader in forward position;

FIG. 12 is a section taken on the lines 12—12 of FIG. 10;

FIG. 13 is an enlarged vertical section of a portion of the feed end of the die illustrating a preferred form of ram tip and shank structure;

FIG. 14 is a vertical section taken on the lines 14—14 of FIG. 13;

FIG. 15 is an elevation, partly in section, of another form of ram tip and shank construction;

FIG. 16 is an end elevation of the ram tip of FIG. 15;

FIG. 17 is a section through the feed end of the die illustrating another ram head and shank structure;

FIG. 18 is an enlarged vertical section of the die and the ram of FIG. 17;

FIG. 19 is a section through a coated article produced by the method and apparatus of the present invention;

FIG. 20 is a longitudinal vertical section through the hopper, ram, and ram actuating cylinder illustrating the stripping device of the present invention;

FIG. 21 is a perspective view of a modified stripping device;

FIG. 22 is a longitudinal vertical section through the die, hopper, ram, ram actuating cylinder, and the mandrel retracting cylinder;

FIG. 23 is a similar section through the hopper, ram and die illustrating the relative movement of mandrel and ram during the forward stroke of the ram;

FIG. 24 is a vertical section through the brake and pressure sealing device at the exit end of the die;

FIG. 25 is a section of reduced size taken on the lines 25—25 of FIG. 24 illustrating the cross-sectional configuration of the brake means;

FIG. 26 is a section of reduced size taken on the lines 26—26 of FIG. 24;

FIG. 27 is a vertical longitudinal section through a mandrel which is provided with a resistance heater and a pair of cooling means; and FIG. 28 is a vertical longitudinal section through a ram tip provided with cooling means.

Referring to FIG. 1, the elements of the aforementioned basic horizontal ram extruding apparatus include an upstanding powder hopper 30, a powder reservoir 31 thereabove with an air permeable cover 31a therefor, a die 32 with a heater bushing 32a, heating element 33, thermocouple 34 and associated temperature indicating device and thermostat 35, a ram indicated generally as 36, and its air cylinder 37 containing piston 38 and piston rod 39 suitably secured by means such as a chuck 40 to said ram. Also in the basic device, there is provided in the base of the hopper a compressed air port, connected through a line 41 with a source of air under pressure, for introducing an upwardly directed stream of air through the powder 42 in the hopper. In the basic device, the die and hopper are an integral unit, and the bands of heating element 33 are positioned considerably closer to the feed end of the die than illustrated in FIG. 1. No means are provided for arresting migration of heat along the die in the direction of the hopper.

In operation of the basic apparatus for the extrusion of shapes, tubes or the coating of wire, assuming the ram to be at the rearward end of its stroke, a supply of compressed air is introduced through line 41 to the hopper at a point corresponding to the upper extrusion of line 41 in FIG. 1, so as to produce a sharp blast of upwardly moving air or gas through the material 42 in the hopper. A single air port in the base of the hopper is not particularly effective for breaking up powder agglomerates since the upwardly moving air or gas tends to channel through the powder in a rather confined zone. The same result occurs when the blast of gas or air is introduced through a plurality of vertical ports in the base. In either event, the air blast is of short duration and usually initiated and interrupted by valve means actuated by the position of piston rod 39. Following the air blast, a quantity of the finely divided "Teflon" powder falls into the die opening. The ram 36 is then advanced through the powder and its forward edge picks up additional material and forces the same into the feed end of the die, wherein the powder is compacted under pressure of the advancing ram as the same moves forward in the barrel of the die.

In both prior art horizontal and vertical dry powder extruders, the ram operates on a timed cycle, that is to say, the ram advances into the die compacting the powder in the preform zone thereof and, continuing its forward motion forces a length of extruded product 50 from the exit end 45 of the die. As soon as the ram reaches the end of its forward stroke, a timing mechanism is started, and pressure is maintained on the die for a given time interval after which the ram is retracted, a blast of compressed gas is injected into the bottom of the hopper and the cycle repeated. Thus it is seen that with each forward stroke of the ram, a quantity of powder is compacted in the die into a slug 49, which slug abuts a previously compacted slug 48 lying farther along the die. Adjacent preformed slugs are slowly advanced under pressure of the ram through that portion of the die surrounded by the heating element 33, wherein the compacted powder is heated above "Teflon" gelation temperature. Under the tremendous radial pressure exerted by the expanding "Teflon" and the restraining pressure of the ram, the particles coalesce to form a sintered article. As the sintered material passes beyond the heating element, it is permitted to cool in the die, and as cooling progresses, the sintered material contracts and breaks away from the inner wall of the die, as at 46 in FIG. 2.

No means are provided in the basic horizontal or vertical apparatus for arresting migration of heat from the heating element 33 through the die to its feed end 43 and adjacent portions of the hopper 30. As a result, previously compacted slugs 47, 48 in the preform zone (FIG. 2) become quite hot in a very short time, which increase in temperature causes a change in the density of the slugs. On the forward stroke of the ram powder from the hopper, which is at a much lower temperature and consequently of much lower density is advanced through the ram entering zone (FIG. 2) and compacted against the aforementioned much hotter slug 48. As a result of this sharp density differential at the slug interface, an imperfect bond between adjacent slugs very often occurs. Slug interfaces 51 are often readily apparent in the finished extruded article, and the product has the appearance of a stack of individual slugs, which phenomenon is known in the trade as "poker chipping." Each one of these visible interfaces constitutes a real flaw in the finished article, and, in the case of a bar, if the same is bent over a mandrel, it will fail along one of the slug interfaces. Poker chipping is one of the most serious defects encountered in products produced by the apparatus of the prior art. It may be alleviated to some extent by reducing ram pressure, but this may well lower final product density which is undesirable.

In accordance with the present invention, it has been found that poker chipping can be substantially completely eliminated by providing a cooling zone intermediate the rear band of the heating element and the feed end of the die. I prefer a water or other cooling fluid jacket 52 surrounding the die as shown in FIG. 2, desirably about the rearward end of the preform and the forward end of the die entering zones. A plurality of fins 53 in contact with the outer wall of the die may also be provided within the jacket. In some instances, fins 53 alone may provide sufficient cooling about the preform zone to prevent overheating of this portion of the die. Wrapping the ram entering zone with a piece of fabric which is kept wet will also provide adequate cooling when extruding articles of both small and large diameter. The water jacket and a positive circulation of cool water therethrough with or without the fins is of course preferred. In any event, means are provided intermediate the heater and the feed end of the die for maintaining the start of the preform zone in the die at a temperature not substantially greater than the temperature of the powder in the hopper, i.e., approximately room temperature. Accordingly, an already compacted slug of powder in the preform zone will not be heated nearly so quickly, and material passing through the ram entering zone of the die and being compacted against a previously compacted slug will be at substantially the same temperature as the slug already in the preform zone. There is no great density differential at the interface of adjacent slugs and as the slugs move forward through the die, they are heated much more gradually and uniformly. As a result of maintaining the entrance of the preform zone at the lower temperature, poker chipping, which had heretofore been thought to be a function of ram pressure exclusively, is substantially completely eliminated.

Furthermore, it has been found that operation of the ram on a timed cycle, as described above, is of no particular advantage. Accordingly, the piston rod 39 of air cylinder 37 is provided with a bar 54 or other suitable means (see FIG. 1) for actuating limit switches 55 and 56, preferably mounted on supporting base 57, at the forward and rearward end of the rod stroke respectively. In operation, pressure is applied to piston 38 which causes the same to move forward to the end of its stroke at which point bar 54 actuates limit switch 55 which, by means not shown, reverses the feed to cylinder 37 and immediately causes retraction of the ram. At the rearward end of the ram stroke, bar 54 contacts switch 56 and the piston 38 begins its forward stroke.

It will be observed from the apparatus illustrated in FIG. 1 that a mandrel 58 is positioned within the die 32 and that the ram 36, piston shaft 39 and piston 38 are hollow so as to accommodate the mandrel, the latter being rigidly secured at its rearward end preferably to the base 57 by means of angle 59 and set screw 61. The apparatus of FIG. 1 is thus arranged for the extrusion of tubing with a mandrel which remains static with respect to the ram. It is also seen from FIG. 1 that ram 36 has a shank portion 62 which is of smaller diameter than the ram tip 63. The ram tip corresponds to the interior of the die with very close tolerances, but for reasons set forth hereinafter the ram 36 is not of substantially the interior diameter, for example, of the die over its entire length.

As indicated earlier, "Teflon" powder has a very high angle of repose and very little ability to flow. When the ram is pushed through the hopper filled with finely divided "Teflon," the ram tends to push the powder aside forming a tunnel and when the ram is retracted a portion of powder is hollowed out in line with the axis of the ram. In order to cave in this tunnel and break up particle agglomerates, an air blast is introduced through a port in the base of the hopper of the basic apparatus when the ram is fully retracted, thus blowing the powder upwardly. As already noted, the air blast merely channels through the powder leaving the same caked around the periphery of the hopper. Increasing the number of ports in larger diameter hoppers merely increases the number of holes blown in the powder, and while some breaking up of loosely coated lumps occurs, a single air blast or a plurality of blasts has little or no effect on tightly compacted lumps. Also, a mandrel passing through the hopper acts as an umbrella and the powder is blown upward by the air blasts thus leaving space beneath. This phenomenon is due to the particularly high angle of repose of the "Teflon" powder and has dictated the use of vertical apparatus for the extrusion of tubing.

*Aerator*

In order to overcome the limitations of the air ports of the basic horizontal apparatus, the present invention provides an aerator with means for specially directing a plurality of air streams in the base 64 (FIG. 3) of hopper 30 as the result of which air under pressure is forced upwardly and generally circumferentially through the powder so as to cause at least one upwardly moving rotating storm of powder in the hopper. While the term "aerator"

is used herein to describe my novel gas distributor, and "air" is mentioned as the gas circulated, these terms are not intended to be restrictive. Thus throughout the description and the appended claims the term "air" is intended to include any gaseous medium, which will not attack the metal parts which it contacts. Obviously, air per se is preferred.

Referring to FIGS. 1, 3 and 4, member 65, preferably in the form of a disc, is detachably mounted in the base of the hopper as by means of locking set screw 67 in bar 66 which is pivotal about pin 68. The underside of member 65 is hollowed out to provide a manifold 71, which is enclosed by bottom cover plate 72 secured to member 65 by a plurality of screws 73. Cover plate 72 is adapted preferably at its center as at 74 to receive compressed air line 41. A circular portion 75 about the axis of member 65 and an outer annular portion 76 are machined out of its upper surface. Disc-shaped member 65 is bored outwardly of circular portion 75 to provide a series of inner passageways 77 connecting the manifold with the upper surface of said disc. The axis of each of said holes is preferably on a circle about the center of the disc as clearly illustrated in FIG. 3. A second series of holes are bored through disc 65 outwardly of annular cut out portion 76, with their axes arranged on a circle near the periphery of the disc, to provide a similar series of outer passageways 78.

The upper surface of the disc is channeled as at 79 to connect the upper end of each of passageways 77 with center portion 75, and similar channels 81 connect outer passageways 78 with annular machined portion 76. A cover plate 82 is provided for the outer series of passageways and channels, and is secured to member 65 by a plurality of screws 83. A similar cover 84 is secured to member 65 by screws 85 over the inner passageway and channels, thus directing the air streams horizontally and reducing the likelihood of powder entering manifold 71 between air blasts. A preferred directional relationship between inner and outer channels is illustrated in FIG. 3, with the arrows in FIGS. 3 and 4 indicating the counter-rotating air streams from the substantially horizontally disposed exit channels 79 and 81.

FIGS. 3 and 4 illustrate a preferred structure for the aerator, one which is simply and economically constructed. Alternatively, the exit channels may be machined into the under surfaces of cover plates 82 and 84. Also it is obvious that other designs may be resorted to in order to provide upwardly and inwardly directed passageways. For example, the exit channels may be eliminated completely by upwardly angled passageways. However, such design will greatly complicate manufacture of a satisfactory aerator. Also the exit portions of the passageways may be directed inwardly at a much steeper angle than indicated in FIG. 3, with baffles employed to direct the air streams generally tangentially. While the aerator has been illustrated with just two series of upward passageways, three or four groups might also be employed. However, the design of FIGS. 3 and 4 is entirely satisfactory. In some cases acceptable results have also been obtained with the exit ends of the inner and outer passageways similarly directed so as to produce two air streams rotating in the same direction.

In operation, a blast of compressed air is supplied to the aerator manifold, timed with the position of the ram. For example, when auxiliary means are provided for preloading the die, the air blast is triggered when the ram reaches the forward end of its stroke in the die. The blast is of short duration, but such a violent storm is created in the hopper due to the whirling action of the upwardly rising air that the ram is retracted without creating a tunnel. When the ram only is relied upon to introduce powder to the die, the air blast is preferably synchronized with the ram as it approaches or reaches the end of its rearward stroke.

Triggering of air to the aerator manifold is effected by means of an electrically operated, quick-acting valve (not shown) in line 41 which is open only briefly, admitting air under high pressure to the manifold thus producing high velocity streams at the exit ends of the passageways. The air stream from the outer passageways quickly picks up particles of powder as it travels circumferentially upward through the hopper and reservoir. Due to its circular path the air stream does not channel through the powder. Instead there is created a turbulent flow of powder, with the particles colliding with one another, thus breaking up powder agglomerates. The action of the air from the outer passageways may be described as a cyclonic storm. A similar storm is created due to the flow of air from the inner passageways, which in the preferred embodiment travels in an anti-cyclonic direction. There is thus created a storm within a storm, i.e., counter-rotating high velocity streams of particles. Centrifugal force causes particles from the inner storm to enter the path of the outer storm, thus assuring complete breakup of any agglomerates, and a violent turbulence is created within the hopper.

The air blast lasts but a fraction of a second, with the valve in line 41 being closed electrically by a change in the position of the ram. However, due to the particular aerator design the powder is charged with so much air that the particles are virtually independently floating on air, with the result that the dry powder flows freely. As they settle, air bleeds out slowly through the reservoir cover. It has been found that the thus aerated powder will retain its improved flow characteristics even after standing for a period of two days, which attests the thoroughness of aeration.

While the aerator of the present invention readily overcomes caking in the hopper and thoroughly aerates the Teflon thus improving its flow characteristics, when extruding products of very small diameter, it is difficult for the ram to push a sufficient quantity of powder into the very small opening of the die. For example, in the extrusion of ¼" O.D. tubing having a wall thtickness of only 0.030", disregarding any allowance for product shrinkage for the purposes of simplicity, the die bore is 0.250" and the mandrel diameter is 0.190". The ram will therefore be a tube having a tip with an outside diameter of slightly under 0.250" and an inside diameter slightly over 0.190", so that it will slide freely over the mandrel and clear the die. From a consideration of the cross-section of the ram tip, it is apparent that the annular surface thereof is not of sufficient proportions to present much of a surface for pushing powder into the die. Also, it must be remembered that the die presents an annular opening with a major diameter of 0.250" and a minor diameter of 0.190". In addition to these restricted dimensions, there is a further tendency as noted above for the ram to tunnel through the powder during its advance, distributing the powder laterally rather than pushing it all ahead into the die. Thus it will be seen that it is exceedingly difficult to obtain substantial, consistent and uniform loading of the die at each ram stroke. Non-uniform die loading causes non-uniformity in the extruded product, especially wall thickness.

While the extrusion of a thin wall tube has been used to illustrate the difficulties encountered in loading the die merely by means of the ram, similar difficulties are encountered in the extrusion of small solid rods or shapes and in the coating of one or more wires. It will be appreciated that where thin walls are required regardless of the cross-section dimensions of the product, non-uniformity will result when the ram alone is relied upon to load the die. The above-noted loading difficulties have heretofore dictated the use of vertical extruders enlisting the aid of gravity to fill the die, where thin walled articles are to be produced.

*Air injector preloaders*

In accordance with the present invention means are provided for preloading the die of a horizontal extruding apparatus. It has been found that the powder in the hopper, when in its maximum free flow condition following the upward blast from the aerator, may be injected into the die by means of a jet of air directed generally at the feed end of the die. Preloading may be most simply accomplished by providing one or more injector tubes 86, illustrated in FIGS. 1 and 2, disposed transversely in the hopper with their open ends directed at the feed end of the die. The tube preferably passes through the hopper wall or rear face plate of the hopper as at 87 with a sliding fit so that the open end of tube 86 may be advanced toward the die opening or retracted as desired, depending upon the space in the die to be loaded with powder. As with the aerator, the blast of air directed through the injector tube is of short duration and is timed with the position of the ram. Preferably, a blast of air is supplied to the injector tube, following operation of the aerator, when the ram is at or near the rearward end of its stroke or has just started to move forward. The inertia of the particles caught in the injector stream carries them forward into the die, and they replace most of the air therein. The particles thus introduced are of course still highly aerated. While the die is being filled by the injector blast, the ram is rapidly advancing so that it enters the die immediately after the powder has been placed therein. The particles are thus compressed and compacted before they have had a chance to settle, which assures a preform of substantially uniform dimension and density. As the ram tip enters the die the powder flows uniformly due to the amount of air surrounding the particles, around the mandrel or mandrels or about the wire or wires to be coated and there is virtually no possibility of producing void spaces in the preform. Flow of the powder during compression continues until substantially all of the air has been forced out of the die, either about the periphery of the ram tip or through the holes therein which accommodate the mandrels or wires. Where the product does not have thin walls, injector air pressure may be reduced without materially affecting loading or the quality of the final product, since the face of the advancing ram tip presents a much larger area for pushing powder into the die.

While the use of one or more simple tubes passing through the rear face of the hopper has been described for injecting power into the die, most satisfactory results are obtained when a plurality of spaced air streams are directed at the die opening. Apparatus for producing this result is illustrated in FIGS. 5–7. The device comprises a thin annular ring 91 having a hollow interior as at 92 which serves as the air manifold. The ring is positioned in the hopper substantially perpendicular to the axis of the ram 36 and centered around the ram. Ring 91 is of course of sufficient inside diameter to permit reciprocation of the ram tip 63 therethrough. Extensions 93 and 93a provided on opposite sides of the ring are drilled to accommodate guide pins 94 and 94a mounted in rear face plate 95 of the hopper. The rear face plate is adapted as at 96 for detachable mounting in the rear wall of the hopper, as by means of stud bolts 97 (FIG. 8). A plurality of holes are drilled in the face 98 of ring 91 to provide a plurality of passageways 99 through the ring into manifold portion 92. It will be seen from FIG. 5 that passageways 99 are angled toward a forward extension of the ring axis so that air streams 101 therefrom are directed more or less into the open end 43 of the die 32. While thus angled passageways are preferred, passageways which are substantially parallel to the ring axis provide satisfactory direction of the air streams so that powder is introduced into the die. Ring 91 is provided with a hollow extension 102 to which is attached an air hose 103, which preferably passes through a hole 104 in face plate 95, and is connected through an electrically operated valve (not shown) to a source of air under pressure. The injector apparatus may be moved forward or backward over guide pins 94 and 94a thus permitting adjustment for various die sizes and the space therein to be loaded with powder. In the apparatus shown in FIGS. 5 and 7, adjustment can be effected by inserting or withdrawing air hose 103. Other means may be provided of course.

*Mechanical preloader*

As an alternative to the air injection preloading means just described, mechanical means are provided for assuring proper die loading. Apparatus for such loading is illustrated in FIGS. 9–12. Referring to FIG. 11, it will be noted that there is telescoped over the ram 36, with suitable clearance for the tip 63 thereof, a preloading tube 111 to which near its rearward end is secured a collar 112 as by means of set screw 113. Collar 112 is provided with a flanged portion 115 having its rearward edge beveled as at 116. Stop means 117 are provided preferably in the rear wall or rear face plate of hopper 30. The forward end of preloading tube 111 is sharply beveled as at 114. An angled bracket 118 is secured to extruder base 57 intermediate hopper 30 and ram actuating cylinder 37 (not shown in FIG. 11), which is adapted to receive a pair of horizontal shafts 119 and 121, the latter being secured to said bracket as by nuts 119a and 121a. Bracket 118 has a semicircular relief cut in it as at 122 (FIG. 10) for passage of the ram shank.

Referring to FIG. 10, shafts 119 and 121 support a sliding cross-head 123, adapted as at 128 for passage of the shank of the ram. Forced fit bearings 124 and 125 are inserted into cross-head 123 for free movement thereof forward or backward over the shafts. Compression springs 126 and 127 are positioned over shafts 119 and 121 intermediate cross-head 123 and bracket 118. Under the force of springs 126, 127 the cross-head bears against the rearward end 129 of preloading tube 111, and drives the same forward through the hopper until collar 112 seats against the stop means 117, as shown in FIG. 11. The forward position of the cross-head 123 is also illustrated by the dotted lines of FIGS. 9 and 10.

A latch bracket 131 is secured as by means of bolt 132 to the ram shank forward of bracket 118. A latch arm 133 is pivotally mounted on the latch bracket, preferably by means of a pin 134. Stop means 135 are provided on the latch bracket and latch arm 133 is normally held down against the stop, as shown in FIG. 11, by means of a spring 136. The latch arm is adapted at its forward end to provide a catch 137 for engaging the forward side of flanged portion 115 of collar 112. The forward end of the catch is beveled as at 138 for engaging the beveled rear surface 116 of the flange thereby enabling the latch arm to ride up over the flange, and the catch under the influence of spring 136 to properly seat on the flange as shown in FIG. 11.

A supporting bracket 139 is positioned intermediate angled bracket 118 and the ram actuating cylinder. On the upper portion of supporting bracket 139 there is positioned a longitudinally extending arm 141 upon which is carried a slide 142. Means such as set screw 143 are provided therein for properly positioning said slide on arm 141. Mounted on the underside of slide 142 is a cam, illustrated as spring cam 144. The rear portion of latch member 133 is provided with a nodal portion 145 for engagement with said cam as the latch moves rearwardly during retraction of the ram.

In order to describe operation of the mechanical preloading device, it is assumed that the ram has just arrived at the forward end of its stroke, the position indicated in FIG. 11. It will be seen that preloading tube 111 is also in forward position with its beveled edge 114 nearly touching the chamfered end 43 of the die. The catch portion 137 of latch member 133 is engaging the flange of collar 112 rigidly secured to the preloading tube. As the ram is retracted by means of an air cylinder, not shown, the catch 137 retracts tube 111, thus compressing springs 126, 127 approaching the position shown in FIGS. 9 and 10. As the node 145 on the latch arm encounters cam 144, the latch is tripped as shown in FIG. 9, thereby releasing the compressed springs which force cross-head 123 rapidly forward against the end of preloading tube causing the tube to advance through the hopper. As the preloading tube advances, its sharp forward end knifes through the powder without dispersing it laterally, thus cutting out a tunnel of powder.

By the time the preloading tube has reached the rearward end of its retracting stroke, the ram tip 63 has also reached fully retracted position as shown in FIG. 12, and then as the preloading tube advances rapidly through the powder, the slower forward stroke of the ram is begun. The ram tip passing through the bore of the preloading tube forces the powder therein directly into the die. At the time the latch is tripped releasing the preloading tube, the powder in the hopper is in fully aerated condition since an upwardly directed blast from the aerator was preferably triggered just prior to ram retraction. Thus the powder within the preloading tube is in a free flowing condition and will flow uniformly into the die under pressure of the advancing ram.

As the ram advances through the preloading tube and ultimately into the die, so also the latch advances along with the ram shank and the beveled edge of the catch portion thereof contacts the beveled edge of the collar, slides over the collar and engages the forward face thereof and the cycle is repeated.

If desired, by modification of the micro-switch arrangement which controls the reversing of the ram, it is possible to effect several short forward strokes of the ram, less than the maximum forward stroke thereof, but of sufficient amplitude to cause the preloading tube to function at each stroke, before permitting the ram to make a full length forward stroke, at which time there would be a sufficient advance of the ram to extrude the product from the exit end of the die. Thus it is possilble to still further improve the degree of loading in the preform zone of the die, if desired.

*Extrusion rams*

In all attempts at horizontal extrusion of Teflon powder heretofore and even in commercial vertical dry powder extruders, the ram over its entire length has a peripheral contour corresponding to the bore of the die, but of dimension slightly less than the interior dimension of the die. Assuming cylindrical products, for example, rods, hollow tubing or coated wire, heretofore the radial clearance between ram and die was always greater than about 0.005". During an extrusion run with this ram clearance it has been found that a thin coating of "Teflon" "skin" forms and adheres to the die wall. This skin forms for a distance of an inch or two at about the end of the gel zone and the beginning of the cooling zone. At first this skin is very thin, but in time it builds up and becomes thicker causing excessive resistance or back pressure on the ram, which increases the pressure required to extrude the product. Increased resistance slows the rate of the production and when ram pressure is excessive, high transverse cleavage planes may occur. Also, as the skin builds up, the product is forced through a smaller and smaller area causing dimensional change in the final product. It was found that by reducing the clearance between the ram tip and the die wall to about .001" or less the formation of skin is greatly reduced and in some cases completely eliminated.

Also as the ram enters the die, a quantity of powder flashes back through this space between die and ram. With repeated reciprocation of the ram into and out of the die, the powder in this space is severely compressed and the particles smeared, and a skin (not to be confused with that formed on the die wall at the gel and cooling zone interface) of smeared particles forms in the bore of the die at its entrance. Furthermore, the particles severely compressed between ram and die wall at the die entrance are damaged to such an extent that they will not sinter and coalesce properly when heated to gelation temperatures. This damage to the "Teflon" is termed "particle smear" and occurs wherever the powder comes between closely moving metal parts. These smeared particles forming the skin in the die entrance tend to flake or scale off and work their way back into the hopper or forward into a preform, thus ultimately appearing in the extruded product. Because of the fact that these smeared particles will not coalesce properly, their presence produces flaws in the finished article, and flaws of this nature in wire coating and material for electrical insulation produce areas of electrical porosity.

From the drawings thus far described it is seen that the ram 36 of the apparatus of the present invention has a tip portion 63 of diameter greater than its shank portion 62. Referring now to FIGS. 13–18, it has been found that the build up of skin in the die entrance zone of the die with attendant impairment of product quality can be greatly reduced by providing a ram which has an enlarged or flanged tip portion 63, which in the case of a cylindrical ram and die, has a substantially greater outside diameter than the shank portion 62 of the ram. With this construction only the tip portion need properly fit the bore of the die. Consequently, this permits the use of a ram shank of standard stock size, e.g., steel tube or rod, since only the tip portion which is secured thereto need be machined to fit the die. Furthermore, a standard size shank may be used for a number of tips of varied outside diameter. Since only the peripheral edge 151 (FIG. 15) of the tip need be machined accurately, instead of that portion of the ram entering the die as heretofore, machining operations are substantially reduced. Not only does the construction of the present invention reduce ram cost and investment in machine tools required to make them, but also it greatly reduces the inventory of stock sizes required for making a full range of rams for extruding various diameter articles. As illustrated in FIG. 13, shank 62 may be shrunk over a rear projection of tip 63 as at 152, or as in FIG. 15, the head may simply be soldered as at 153 to the face of the shank. The length of the ram tip is approximately 1/16 to 1/8" depending upon the diameter of the product being extruded.

FIG. 17 and the enlargement thereof which is FIG. 18 illustrate a ram of the present invention which is used in the production of very small diameter tubing, or the coating of fine wire. In this embodiment, shank 62, for example having an outside diameter of only 0.062" is inserted into a much heavier shank body 154 and soldered in place as at 155, with the ram tip 63 secured to the shank by one of the methods described. The length of shank 62 intermediate the ram tip and shank body 154 is sufficient to permit entry of the tip into the die the required distance without the shoulder 156 of the body striking the end 43 of the die. This embodiment provides a ram which has the required rigidity, notwithstanding its otherwise inherent frailness and flexibility due to the small diameter of shank 62. Rigidity is essential for maintaining good alignment between ram and die, thus preventing buckling and rubbing. Unnecessary friction between ram tip and the bore of the die of course requires additional ram pressure which is to be avoided wherever possible.

The ram construction above described with enlarged tip corresponding to the inside diameter of the die permits much closer clearance between ram tip and die wall than is possible with rams not embodying a shank portion. Rams with the portion thereof entering the die of uniform diameter require a radial clearance greater than .005". With the ram construction of the present invention, the radial clearance 157 between the peripheral edge 151 of tip 63 and the die need only be between .0005" and .001", thus greatly reducing the area for powder flash back. Furthermore, the short length of tip 63 reduces the peripheral area of the tip for compressing powder in space 157 against the die wall, which in combination with reduced powder flash back reduces the amount of skin formed in the bore of the die.

Referring again to FIGS. 13 and 14, it is seen that a mandrel 58 may pass through the center of the ram tip, and also a plurality of smaller mandrels or wires 58a, 58b between its center and peripheral edge. Thus articles may be extruded with, for example, a hollow core and a plurality of wires therein, or with a plurality of holes therein. With the ram tip of the present invention holes may be located anywhere in the cross-section thereof. This feature is of major advantage and one which from a practical standpoint is unique to the present design, because it is extremely difficult to drill deep holes such as would be required through a solid ram, particularly if the holes are relatively small as for example 0.015" or 0.020" in diameter.

In many applications, for example, in heavy wall tubing of large diameter, I have found that product uniformity is improved when the forward portion of the ram is cooled, preferably as illustrated in FIG. 28. In order to accomplish this, the ram tip 63 is preferably provided with an inwardly directed annular flange or projection 340 inwardly of its peripheral edge. The ram shank 62 is soldered to the outer side of the flange and to the rear face of tip 63 as at 341, and a transversely positioned annular plate 342 is secured to the projecting end of flange 340 and also to the interior of the ram shank as at 343. A sealing bushing 344 adapted to permit passage of the mandrel therethrough is soldered to the inner edges of tip 63 and annular plate 342 as at 345 and 346 respectively. As a result of this construction an annular chamber 347 is provided abutting the tip of the ram, and a coolant medium is circulated theerthrough by way of flexible tubes 348 and 349. Obviously, the ram head may be modified to provide a cylindrical cooling chamber if the product being extruded is a solid shape.

While the novel ram structure has been described in terms of a cylindrical tip, obviously other shapes may be employed. Also, the ram shank need not be a cylindrical member, nor is it necessary that the mandrels be of circular cross-section. In addition, a plurality of already coated wires may be run through the ram tip and simultaneously again coated to produce the cable-like product of FIG. 19.

*Wiper seal*

As indicated in the above description of the novel ram of the present invention, the formation of any smeared particles of Teflon in the hopper or at any point in the apparatus where they may eventually work into the hopper or product is to be avoided. A common source of particle smear exists in the bearing in the hopper through which the ram shank reciprocates. It would normally be assumed that this bearing should provide as little radial clearance as possible so as to better contain the powder in the hopper. However, it has been found that when such means are employed, a quantity of powder will collect in the bearing and due to reciprocation of the ram shank the particles are compressed and flakes of smeared particles are formed, which on the forward stroke of the ram tend to work themselves into the hopper. Once in the hopper the flakes appear in the extruded product causing the imperfections noted earlier.

In order to avoid this source of smeared particles, in accordance with the present invention, there is provided a fitting 161 (FIG. 1) in the rear face plate of the hopper which provides a throat 162 with substantial radial clearance for the ram shank. This throat is of sufficient proportion so that powder collecting therein will not be compressed upon itself between the fitting and the ram shank. In order to avoid leakage of the finely divided powder through the throat, annular wiper means 164 are provided on the exterior of the fitting which are in contact with the ram shank. The wiper is flexible and is desirably a lint-free non-woven fabric, although any material which is sufficiently flexible to prevent the formation of particle smears thereagainst, and which will cling to the ram shank, is satisfactory. Alternatively, fitting 161 may be eliminated by providing a large hole through the hopper or rear face plate for the ram shank, which would be equivalent to throat 162. The wiper may then be affixed to the exterior of the hopper as in FIGS. 20 and 22, or secured in the hopper or face plate hole as by means of rings 165 in FIG. 5.

*Hollow ram stripping means*

When producing hollow articles or when coating a single wire or a multiplicity of wires, and especially when coating stranded wire, it is necessary that the hole in the ram tip be somewhat larger than the diameter of the wire or mandrel which passes therethrough. If the radial clearance through the tip is too great, there is danger of the wire being located eccentrically, and if the clearance is too little, binding abrasion or buckling of the wire may occur. Consequently, it is necessary to confine clearance through the ram tip to a suitable compromised degree, generally of the order of a few thousandths of an inch. Regardless of how close this clearance is, a certain quantity of powder passes about the wire, through the ram head and works its way back along the wire into the hollow ram shank. As the extrusion operation continues, the powder becomes very closely compacted around the wire where it passes through the ram tip and in the ram shank, eventually preventing free passage of the ram tip over the wire during the retracting stroke and/or passage of the wire through the ram tip. Furthermore, as the finely divided powder passes through the small clearance space, it becomes severely compressed, particularly where stranded wire is being coated, and as a result of this action, particle smear is produced at a point where the imperfect smeared particles can work into the preform zone of the die. Accordingly, in cases where it is necessary to make continuous runs of long duration in order to obtain long lengths of extruded product, it is necessary to shut down the extruder periodically and clean out the powder that has worked back into the hollow shank of the ram. Under these conditions it is difficult to produce long lengths of the finished product.

In order to eliminate the necessity for periodically dismantling the apparatus to clean smeared particles from the hollow ram shank, the present invention provides a stripping device which is positioned within the ram shank for collecting the smeared and compacted particles, and by means of which they may be periodically removed without dismantling the apparatus. Referring to FIGS. 20 and 21, a wire 171 to be coated extends through the hollow shaft of piston rod 39, the hollow ram shank 62 and through ram tip 63. In its simplest form, the stripping device which is disposed within the shank comprises a generally elongated hollow body portion 172 with the upper half thereof cut away as shown in FIG. 21. Body portion 172 is of substantially the same external dimension and configuration as the interior wall of the shank, e.g., cylindrical as the ram shank of FIGS. 20 and 21. The upper open portion of the body permits quick removal of smeared particles 173 therefrom when the stripping means is withdrawn. A half cylinder is preferably provided for the reason indicated. Body portion 172 is provided with a forward end 174 of substantially the same cross-sectional dimension as the interior of the shank, with only sufficient peripheral clearance being provided for easy removal of the stripper. As illustrated in FIGS. 20 and 21, the forward end 174 is drilled as at 175 for passage of wire 171. In the embodiment illustrated in FIG. 20 the stripper has an open end, while the device of FIG. 21 has a semi-circular rearward end 176 corresponding to body portion 172, with a recessed portion 177 to accommodate the wire. A handle 178 is secured to the body 172 and extends through hollow piston rod 39 of the air cylinder. The rearward end of handle 178 is secured as by set screw 179 to a bracket 180 mounted on piston rod 39 beyond the cylinder. When properly positioned, the forward end 174 of the body portion of the stripper is held by means of its handle and set screw 179 firmly against the inner face of ram head 63, and reciprocation with the ram.

At certain intervals when a sufficient quantity of smeared particles 173 have accumulated in body 172 by passage through space 181 in ram tip 63, as illustrated in FIG. 20, the extruding cycle is stopped momentarily with the ram on the forward portion of its stroke. Set screw 179 is loosened, handle 178 is grasped and the stripper is pulled out of the apparatus. Compacted powder adhering to wire 171 is striped therefrom as the forward end 174 of the stripper is drawn thereover. With the stripping device withdrawn beyond the end of piston rod 39, the material therein is quickly removed. It is immediately reinserted with its forward end against the rear face of the ram tip and extrusion is continued. Removal of the device requires only a few seconds and does not interupt the extruding cycle sufficiently long to change or impair the quality of the product.

This cleaning out operation may be repeated as necessary to keep powder from clogging the mechanism. On the other hand, without the stripping means, it is necessary to shut down the extruder, remove the powder in the hopper, disassemble the ram mechanism, clean out the interior of the ram shank and strip adhering flakes of smeared particles from the wire.

*Retracting mandrel*

Referring again to FIG. 2, the preform, gel and cooling zones are illustrated in the manufacture of tubing. In the preform zone the powder under compression as a result of the forward stroke of the ram presses against the wall of mandrel 58 and the die thus creating a substantial amount of friction which resists longitudinal movement of material through the die. In the gelling zone similar resistance to longitudinal movement exists due to friction between the now rapidly expanding "Teflon" and the bore of the die as well as between the "Teflon" and surface of the mandrel. In the cooling zone where the gel solidifies, resistance to longitudinal movement exists due to the contraction of the product about the mandrel, even though the cooling product ultimately breaks away from the die as at 46. Most of the resistance in the cooling zone is confined to friction between product and mandrel, and for some sizes of tubing, mandrel resistance is greater than die wall resistance throughout.

The sum of the resistances in the several zones within the die must be overcome by ram pressure in order to extrude a finished product. Where multiple mandrels are employed to produce a product with a plurality of holes therein, friction is substantially increased and accordingly ram pressure must be correspondingly increased. As noted earlier where ram pressure becomes too high, objectionable "particle smear" invariably results. A plurality of mandrels of course increases the likelihood of the appearance of these defects in the product.

As already noted, extrusion of tubing heretofore has not been practical in horizontally disposed apparatus due to the feeding problem, and thus all tubular extrusions on a commercial scale, which has been limited to heavy wall tubing, have been accomplished with the vertical apparatus. It has also been suggested that ram pressure with the vertical extruder might be reduced if the mandrel were advanced through the die along with the ram. If the mandrel is allowed to advance, obviously there will be no friction between material in the die and the mandrel, and it is said that extrusion pressure can be reduced by as much as 50%, depending upon the relationship of the mandrel diameter to the inside diameter of the die, as well as other factors.

All apparatus for the dry powder extrusion of "Teflon" tubing heretofore has operated on the timed ram cycle, noted above, and according to the best source of information on vertical dry powder extrusion of "Teflon," when it is desired to employ a movable mandrel, the same is rigidly affixed to the ram. In operation of such apparatus as the ram moves forward, so also does the mandrel. When the ram has reached the end of its stroke, pressure is maintained for a given length of time, after which the ram and the mandrel are retracted simultaneously. It has been found that it is impractical to operate in this fashion with a mandrel of uniform diameter over its length within the die. During retraction of such a mandrel undesirable stress planes are created in the "Teflon" cooling and gel zones. Because of increased mandrel resistance in the cooling zone, the product is not stripped from the mandrel as the latter is retracted, but rather it is stripped from the die wall, which tends to pull the extrusion back into the hopper. In order to overcome this limitation the use of a mandrel which is tapered over its entire length has been suggested. It is said that such a mandrel permits uniform expansion of the "Teflon" in the gel zone. However, it has been found that a tapered mandrel produces unequal radial pressure in the die, which results in a product of lower final density. Thus in order to operate satisfactorily with a mandrel affixed to the ram, the mandrel must be tapered so as to prevent stripping of the material from the die during retraction. As a result of the use of the tapered mandrel the density of the tubular product is substantially less than that obtained with a fixed mandrel of uniform diameter. Furthermore, even with a tapered mandrel mounted on the ram, it has been found that the compacted material in the preform zone, which is normally weak, will in some instances fracture during mandrel retraction, and it is well recognized that fracture of the preform results in a poor final product.

Tapered mandrels are impractical from a cost standpoint due to the precise machining required. Also, mandrels of this type which are affixed to the ram are not interchangeable with other dies, since the outside diameter of the finished product dictates the length of the mandrel and the angle of taper therefor. In addition, with the mandrel affixed to the ram, adjustment of the length of the mandrel extending into the die is not possible.

It has been found that the aforementioned disadvantages may be overcome by providing apparatus wherein the mandrel is either free to move forward or is advanced through the die with the product being extruded under ram pressure, and then with the ram in forward position and pressure thereon maintained, the mandrel is retracted. Furthermore, in accordance with the present invention, a tapered mandrel is not required.

Referring to FIGS. 22 and 23, rearwardly of ram actuating cylinder 37 in line with the rod 39 thereof, a double acting mandrel retracting cylinder 201 is positioned upon extruder base 57. Its design is similar to the ram actuating cylinder and it is fitted with piston 202 and hollow piston rod 203. Means such as chuck 204 mounted on piston rod 203 rigidly secures mandrel 58 thereto, assuring movement of the ram in response to piston 202. In the embodiment illustrated in FIG. 22, chuck 204 is shown on the forward end of piston rod 203, but this is a matter of choice and a chuck or other means for securing the mandrel to the piston rod may conveniently be positioned rearwardly of cylinder 201. A bar 205 is affixed to piston rod 203 of design similar to bar 54 associated with piston rod 39 of the ram actuating cylinder, and a limit switch 206 is provided as shown in FIG. 22 for operating an air valve, not shown.

In the appartus illustrated in FIG. 22 the mandrel has just completed its retracting stroke and bar 205 has struck limit switch 206 which reverses a valve, not illustrated, in the pressure lines to the mandrel retracting cylinder. In response to limit switch 206, pressure lines 207 and 208 in cylinder 201 are opened to the atmosphere, as is line 209 in cylinder 37, and pressure is applied over pressure line 210 therein, thus forcing piston 38 and the ram attached thereto through rod 39 thereof toward the rearward end of cylinder 37, thus retracting the ram. When bar 54 contacts limit switch 56, a valve associated with the ram actuating cylinder is operated, line 210 therein is opened to the atmosphere and pressure is applied through line 209 thus forcing the ram forward through the hopper and into the die. During the forward stroke of the ram, product is extruded, and under the compressive force of the "Teflon" in the die, the mandrel 58 is drawn forward along with the product, as shown in FIG. 23. At the end of the ram's forward stroke, bar 54 contacts limit switch 55 which, through the aforementioned valves, applies pressure to line 207 of cylinder 201. Pressure is maintained through line 209 thus holding the ram in forward position. With pressure thus applied the mandrel 58 is retracted a distance substantially equal to the distance which the same moved forward during the ram extrusion stroke. When bar 205 contacts limit switch 206, the cycle is repeated. In view of the fact that cylinder 201 is double acting, should it prove necessary or desirable to apply pressure to the mandrel during the forward stroke of the ram, this may easily be accomplished.

Ram cycle

The present apparatus does not function on a timed ram cycle, but is governed by physical and thermal changes occurring in the plastic material in the die, regardless of the shape of the product or whether or not a reciprocating mandrel is employed. Thus, the ram may advance rapidly while compacting the powder in the preform zone and then stall and then again advance to extrude the product from the die. A cycle of this type which is governed only by resistance within the die is thus synchronized with the occurrence of these changes and permits maximum extrusion rates while maintaining product uniformity.

Braking and sealing device

In addition to the foregoing improvements in the horizontal apparatus, which alone and in combination add improved controls to the extrusion operation and improve the quality of the extruded product, the present invention provides means associated with the exit end of the die for further controlling variables in the extrusion cycle.

Referring to FIG. 24, it will be seen that the exit end of die 32 is turned and threaded as at 221, and an adapter sleeve 222 externally threaded as at 223 is screwed thereon. The hub or boss portion 224 of a flanged fitting 225 is screwed onto threads 223 of sleeve 222. Flanged fitting 225 is centrally tapped and threaded as at 226 and a bushing 227 with a central opening therein just adapted to permit passage of the extruded product 50 therethrough is seated in the threaded portion 226 of the flanged fitting. Bushing 227, adapter sleeve 222 and the hub 224 are all annularly grooved for receiving O rings 228, 229 and 230, respectively, which are preferably of silicone rubber or other equally effective pressure sealing material. Gasket means 220 are provided intermediate the rear end of bushing 227 and the forward face of flanged fitting 225. The sleeve, flanged fitting, its hub and the bushing are so arranged as to provide a sealed off space 231 about product 50 immediately beyond the exit end of the die. Access to the sealed off space is provided through a pipe 232. In a modification of the apparatus thus far described, access is also provided to the interior of the sealed off space 232 through a second pipe 233, illustrated in the dotted lines of FIG. 26, for circulating fluid through said space.

The above assembly of components is referred to herein as the seal, and it is to be understood that this apparatus alone may be attached to the exit end of the die. Preferably, however, a second major assembly is associated with the seal, and consists of a disc member 241 positioned adjacent bushing 227, and a second disc member 242 removed therefrom. These discs are connected by a plurality of bolts 243—243a about the periphery thereof, two of which are illustrated in FIGS. 24–26. Both discs are drilled to provide free passage of the extruded product therethrough as at 244 and 245. Between the discs and encircling the extruded product is a rubber tube 246, or other material in the form of a tube which will not abrade the product, with its ends flanged as at 247. A metal cylinder 248 surrounds tube 246 with its ends engaging the inner sides of flanged ends 247. Spacer means 249 and 249a are provided about bolts 243—243a intermediate the discs 241 and 242, and the flanged ends of rubber tube 246 are pressed between the ends of cylinder 248 and the opposed inner surfaces of the discs by tightening nuts 250—250a, thus sealing off an annular space 251 between the cylinder and the rubber tube. The metal cylinder is drilled and tapped as at 252 to receive liquid or gas pressure line 253. When compressed liquid or gas is introduced through line 253 into the annular space 251, rubber tube 246 is forced against the outer wall of the extruded product and grips the same, acting as a brake which retards longitudinal movement of the product.

Bolts 243—243a of the brake assembly pass through sliding fit holes in the flange fitting 225 of the seal member and are fitted with heavy springs 252—252a and adjustable thrust collars 253—253a. With this arrangement, longitudinal movement of the brake is restricted or retarded by the action of the springs. Alternatively, the braking means may be associated with the end of the die as through the elements comprising the sealing member, in which event the elements thereof are not adapted to provide a sealed space 231, but rather a rigid support for bolts 243—243a.

Again referring to FIG. 2, it will be recalled that back pressure, or resistance to the forward movement of the ram, while compressing and extruding is composed of six components, namely, wall and mandrel resistance in each of the preform, gel and cooling zones. With the reciprocating mandrel above described or where extruding wire or a solid product, resistance to forward movement of the ram is of course reduced to the sum of die wall resistances in the preform, gel and cooling zones. In any event, ram pressure is dictated by resistances in the die and has a marked effect upon the properties of the product. Where resistance is too low, the product may be undersize, and where resistance is too high, slippage planes and particle smears are created.

Where the product is running slightly undersize, back pressure, i.e., resistance, may be increased by means of the brake just described, and a product of uniform size can thus be maintained. This is accomplished by applying pressure through line 253 to the annular chamber 251. By proper control of the gas or fluid pressure, back pressure is increased, and consequently an increase in required ram pressure, which brings the product up to size. Thus increasing the back pressure has the effect of raising the density of the extruded article.

However, if back pressure is too high, either with or without application of the brake, the introduction of gas or fluid under pressure through inlet pipe 232 to the space 231 in the seal and against the outer wall of the product causes the same to break away from the inner wall of the die at a point closer to the heating element, for example at 254, as illustrated by the dotted lines in FIG. 2. This earlier breakaway from the die wall where a solid article or coated wire is being extruded reduces back pressure in the cooling zone. Thus the brake and the seal provide independent and controllable means for increasing or decreasing back pressure as required.

It has definitely been established that the rate of cooling affects the crystal structure of the product, with rapid cooling improving certain product qualities. Thus it is sometimes desirable to accelerate cooling. This may be accomplished by reducing the length of heater bushing 32a, FIGS. 1 and 2, which encloses a portion of the cooling zone or by affixing air fins to the die at this point. However, the seal of the present invention may be adapted to serve as positive cooling means by providing an exit pipe 233 illustrated in the dotted lines in FIG. 26 for the space 231 and circulating a coolant through said space in direct contact with the surface of the extruded product. Forced cooling thus shortens the length of the cooling zone and decreases back pressure. In some applications this decreased back pressure may be undesirable in which case a fluid under pressure is applied to the annular chamber 251 of the brake and back pressure restored to the desired degree. Thus the brake and seal arrangement not only provides positive cooling means but also means for correcting back pressure due to the reduction therein caused by positive cooling.

"Teflon" in cooling from the gel state to normal room temperature shrinks approximately 25% by volume. The resistance due to friction between the cooling product and the die wall in the cooling zone decreases along the length of said zone to a point where the product breaks away therefrom and die wall resistance becomes zero. While the product has shrunk enough to free itself of the die wall, cooling is still not complete and shrinking continues without restraining pressure upon the product. If complete cooling of the product could be accomplished under pressure, product quality would be substantially improved, particularly if this pressure were uniformly applied over the external surface of the product and particularly if the application of such pressure would not introduce the accompanying objectionable additional back pressure. For example, pressure upon the product may be prolonged during its cooling by the use of a tapered die. However, dies of this character are quite costly and the desirable results which may be obtained thereby are over-shadowed by the increase in back pressure which results.

With the use of the seal means of the present invention, pneumatic or hydraulic pressure may be applied around the cooling product without appreciably increasing the back pressure in the cooling zone. The use of the seal decreases die resistance in the cooling zone and makes possible a longer gel zone in the die which further enhances product quality. Thus the seal provides means for maintaining pressure on the extruding product without increasing back pressure or injecting other undesirable variables into the process.

In addition to the foregoing improvements, I have found that the rate of tube extrusion can be increased by heating the mandrel in the gel zone of the die. With simple exterior band heaters of either the resistance or induction type, the compacted powder advanced from the preform zone is heated primarily from the outside, since the metal die is at a substantially higher temperature than the mandrel. Such heating is of course slow, with the powder adjacent the die wall turning to a gel before that nearer the mandrel, the change being indicated by solid lines 301 between the preform gel zones in FIG. 2.

*Mandrel temperature controlling means*

It has been found that much quicker and more uniform heating of the powder with resulting increase in production is possible if at least a portion of the mandrel surrounded by the external band heater is itself heated. For example, a hollow mandrel 58 with more than a one-half inch inside diameter is fitted with an internal resistance heater 310, as shown in FIG. 27, with its heating elements in close proximity to the inner wall of the mandrel, and connected through lead wires 311 to a suitable source of current, not shown, at the rearward end of the apparatus. The internal heater is positioned in the mandrel so as to be beneath the external heater 33 (FIG. 1), and a thermocouple 312 is provided as shown for noting mandrel temperature adjacent the internal heater. Its effect in combination with the external heater is to raise the compacted powder to gelling temperature much more quickly and uniformly, both from inside and out, thus speeding production. With the supplemental heater in the mandrel, change to the gel state occurs nearer the hopper and the interface between compacted powder and gel appears as dotted lines 302 in FIG. 2.

I have also found that migration of heat along the die and mandrel in the direction of the hopper may be more effectively arrested and product uniformity still further improved by providing a cooling element in the larger size mandrels, rearwardly of the internal heater, if one be employed, generally beneath the external cooling element 52 which is located between the external heater and the powder hopper. Such an internal cooling element is designated generally as 300 in FIG. 27, and preferably comprises a pair of hollow plates 313 and 314 disposed transversely in the mandrel, and having outside dimensions corresponding to the interior of the hollow mandrel. The plates are connected at their central openings by a cylindrical member 315 so as to provide an annular chamber 316. The peripheral edges of each of the respective plates are provided with O-rings 317 and 316 to assure the integrity of chamber 316, and a coolant is circulated to the chamber by means of pipes 319 and 320.

In many product applications a material of low crystallinity is desirable, and it has been established that the percent crystallinity in the "Teflon" product is a function of the rate at which the sintered material is cooled, with increases in the rate of cooling decreasing crystallinity. Accordingly the present invention contemplates the possible use of an external cooling element to more quickly cool the die and extruding product beyond the gel zone. In this connection, when producing hollow articles of fairly large I.D., increased product cooling rates following sintering are possible in accordance with the present invention by providing cooling means within the hollow mandrel positioned so as to be beneath the rearward end of the gel cooling zone. Such a cooling element is illustrated in FIG. 27 and is designated generally as 330. This second cooling element is preferably substantially the same as cooling element 300 already described, and in FIG. 27 the structural parts thereof are designated by the letter "a." It should be noted that coolant pipes 319a and 320a of cooling element 330 as well as leads 311 of the thermocouple 312 pass through the opening provided by cylinder 315 of cooler 300.

Thus while FIG. 27 depicts a mandrel with two cooling devices and a heating element, it is not necessary that all three elements be present together in the mandrel. By the use of one, two or all three of these devices, various zones in the mandrel may have their temperatures varied or controlled during the extrusion cycle. By proper longitudinal disposition of these devices the location of the various temperature zones in the mandrel may be changed as desired to improve the properties of the product and its uniformity. For example, forced external cooling only of the sintered material tends to produce a product of enlarged internal dimensions, while forced internal cooling only at this point tends to reduce the I.D. of the product. Accordingly, cooling both externally and internally with element 330 results in a product not only of reduced crystallinity, but also of uniform internal dimensions.

In carrying out the process of the present invention, the body of powder to be extruded is thoroughly aerated prior to introduction of the same into the die. This is preferably accomplished with the aid of the aerator which operates as above described. Following thorough aeration a portion of now free-flowing powder is introduced to the die. As indicated, loading may be accomplished in several ways: the ram advancing through the aerated powder, by one or more air jets directed through the powder and at the die opening, or by means of a mechanical preloader. With the die loaded, the ram, preferably operating on a stroke of given length, is advanced into the die. Under pressure of the ram the powder is compacted and material is forced through the die.

For reasons noted earlier, in the present process the beginning of the preform zone of the die is cooled, preferably positively, preventing migration of heat back along the die, which contributes greatly to the uniformity of the extruded product. In the present process the body of powder to be extruded is not preheated before it is introduced to the die, and cooling of the entrance of the preform zone is preferably such as will maintain the compacted powder therein adjacent the body of powder at or just slightly above uncompacted powder temperature. The powder in the hopper is preferably at or just above room temperature.

Complete aeration of the powder and cooling of the entrance of the preform zone comprise the essential features of the present process. Heating of material in the die must of course be to gelling temperature under the conditions of pressure, and it is has been found that about 620° to 770° F. is satisfactory. The present process in addition to the aforementioned essential steps may also include the various additional steps of retracting the mandrel, braking the extruded product and/or force cooling the same, all of which features are set forth in detail above.

By operating as aforesaid, and with the apparatus described, it is possible to extrude solid articles or tubing or coat one or more wires from not only "Teflon" 1 and 5 powder (30 to 60 mesh), which are the grades employed in dry extrusion, but also from "Teflon" 6 (particle size about 0.25 micron), which heretofore has been used only in paste extruding apparatus, and from "Teflon" 7X (particle size 2 to 3 microns) which has been used only for mouldings. Furthermore, none of the aforementioned commercially available grades of "Teflon" requires a lubricant in the apparatus of the present invention.

Heretofore in dry powder extrusion, the "Teflon" has either been all prebaked or a mixture of prebaked and unbaked powder with said mixtures containing at least about 25% prebaked material. In prebaking the powder is heated to between about 300 and 500° C. for a period of time, which results in reduction of crystallinity from the order of 95% to about 50% or less. The prebaking improves the flow characteristics of the powder, but also lowers its density and its coefficient of thermal expansion, which latter reduction results in a reduction of radial pressure during heating in the confines of the die. The end result with prebaked powder or mixtures containing the same is a product of lower density than when unbaked powder alone is employed. However, prior to the present invention it was not possible to properly extrude unbaked powder, due to its poor flow characteristics, and the articles produced from this material were of non-uniform density and were characterized by the presence of flaws.

In accordance with the present invention it is now for the first time possible to produce by dry powder extrusion uniform, dense, articles free from flaws with the use of 100% unbaked polytetrafluoroethylene powder, which results in substantial savings in raw material costs. It is believed that the thorough aeration of the powder provided in the present process and by the present apparatus permits the use of unbaked powder, but I do not wish to be limited to this possible explanation. In the present process unbaked powder is thus preferably employed, although if desired prebaked or mixtures containing prebaked powder may be used, but with a sacrifice in product density.

In the "Teflon" coating of wire by the dry powder method, for example, apparatus in current use is limited to minimum wall thickness to about 0.100". In accordance with the present invention, uniform coatings as thin as 0.007" have been obtained, and with the present apparatus the extrusion of a 0.015" coating onto 0.025" O.D. wire has been readily accomplished. Tubes with wall thicknesses as low as 0.007–0.015" are also readily obtained.

As indicated, the product produced by the apparatus and process of this invention has an extremely low porosity which of course enhances its dielectric properties. Sample rods extruded from 100% unbaked polytetrafluoroethylene powder as above described were submitted to E. I. du Pont de Nemours & Company for determination of porosity, tensile strength and elongation, rods or bars being the preferred form for determining these physical properties. Porosity measurements were made by determining the specific gravity of sections cut from the rods and comparing these values with the densities of solid specimens of equivalent crystallinities, heretofore considered standards by Du Pont. The reliability of these measurements is said to be ±0.3%. Tensile strength testing was conducted in accordance with ASTM D–638–52T, and elongation was also determined in a conventional manner. The results of these tests were as follows:

| Rod Diam. (in.) | Porosity, percent | Tensile Strength, p.s.i. | Elongation, percent |
|---|---|---|---|
| ¼ | −0.4<br>−0.2<br>−0.3<br>−0.3 | 1,833<br>1,833 | 200<br>185 |
|  | Ave. −0.3 | Ave. 1,833 | Ave. 192 |
| ⅜ | Ave. −0.3<br>−0.4<br>0.0<br>−0.4 | 1,600<br>1,700<br>1,600 | 205<br>150<br>135 |
|  | Ave. −0.26 | Ave. 1,633 | Ave. 163 |
| ½ | −0.1<br>0.0 | 1,614<br>1,786<br>1,643 | 300<br>400<br>410 |
|  | Ave. −0.05 | Ave. 1,681 | Ave. 370 |

It is noted that in all instances the products were of equal porosity or less porous than the standard "Teflon" material with which they were compared. In view of results as low as −0.4%, compared with standard porosity equal to zero, the articles tested were, it is believed, the least porous extruded "Teflon" products ever produced.

The tensile strengths of the samples were found to be normal, as were elongations for the ¼" and ⅜" rods. The elongation of the ½" rods is higher than usually found, the latter being of course desirable.

It will be noted that the present invention permits the production of a wide variety of shapes, tubes and even the coating of multiple wires. For example, the product of FIG. 19 comprises a plurality of wires which have been coated with different colored "Teflon" and all of the wires embedded in a "Teflon" outer coat. The article of FIG. 19 is produced by extruding the outer coating over the six already coated wires. The primary colored coatings for the various wires may be applied by dry powder ram extrusion or by paste extrusion, depending upon the thickness of the colored coating required.

The present invention provides a still further extrusion method for improving the porosity of the finished article, particularly where the article is a coated wire. It has been found that porosity is a function of particle coalesence and that improved particle fusion may be obtained by increasing the pressure on the "Teflon" during the period of coalescence. Thus the process of the present invention includes the steps of first extruding an initial coating on the wire and then extruding a second coating superimposed upon the first. When the first coating is being covered during the second extrusion, the coated wire acts as a mandrel which moves forward with the product and, due to the high coefficient of thermal expansion of "Teflon," the initially coated wire constitutes an expanding mandrel which greatly increases radial pressure in the gel zone of the die. As a result the entire cross-section of the material is under severe compression during coalescence and also during the cooling cycle up to the point where it has contracted sufficiently to break away from the die wall.

This process improves the quality of the product in two ways. First, the greatly increased pressure within the die heals any porosity in the initial coating. This effect is so pronounced that even reclaimed sintered Teflon powder can be used for the initial coat. It has been thought heretofore that sintered scrap material such as turnings, etc., could not be properly reprocessed so as to produce an electrically non-porous product. Secondly, the properties of the second coating are likewise improved, and the second coating may consist of 100% reclaimed material.

Where the wire to be coated is of multiple strand twisted construction or woven wire, the smaller sizes may be initially coated by paste extrusion. Usually paste extrusion is impractical for coatings thicker than 0.020". In the larger sizes, paste extrusion is not commercially practicable and the dry powder method of the present invention is dictated. The initial coat constitutes a smooth foundation, thus presenting a trouble-free surface for application of the second coat by dry extrusion.

If desired, either or both coats may be of reclaimed material since double coating ensures minimum porosity of the inner coating. This method of overcoming porosity permits the manufacture of wire with a "Teflon" insulation coating as thin as possible and yet one which has maximum dielectric strength. Because of its resulting lower porosity, the inner coating may be reduced to a thickness less than a single coating of virgin "Teflon" and still have the requisite insulating ability. When application of the second coating is complete, this latter coating may if desired be removed by centerless grinding or by other suitable means such as a trimming die, thus leaving only the thin initial coat which is non-porous.

By way of illustration, a length of single strand copper covered steel wire 0.0356" in diameter was coated by the method and apparatus of the present invention with finely ground 100% reclaimed sintered "Teflon" scrap to a final outside diameter of 0.119". The thus coated wire was again coated with the same material applied to a diameter of 0.189". Thus the thickness of the first coating was approximately 0.0422" and that of the second coat approximately 0.035". Before applying the second coating, the initially coated wire was subjected to an electric spark test and found to be porous throughout its length of some 12 feet. On the other hand, after the second coating a similar spark test showed the product to be electrically non-porous throughout. Following the second extrusion of the wire, the outer coating was cut away for a distance of several feet and its exposed length was tested and found to be electrically non-porous.

A length of the doubly coated wire was immersed in plain tap water at room temperature for a period of 15 hours. At the end of this period, voltage was applied at the rate of approximately 2 kv. per 5 sec. The final reading was 19 kv. A second portion was immersed in water for four hours at 85° C. followed by immersion for ½ hour in salt solution. Voltage was applied as above and the final reading was 14.5 kv.

The commercial value of this aspect of the present invention is significant since sintered scrap, which it had been thought was useless for the production of electrically non-porous materials, may now simply by fine grinding be converted into a material which is suitable for wire coating.

Obviously the apparatus and methods above described may be varied without departing from the spirit and scope of the present invention, and it is to be understood that the invention is not limited to the specific embodiments thereof except as defined in the appended claims.

What is claimed is:

1. Apparatus for the ram extrusion of polytetrafluoroethylene powder comprising in combination a powder hopper, an extrusion die with access to said hopper, a reciprocating ram adapted to transverse at least a portion of said hopper and enter said die compacting powder in the die and forcing product from the opposite end thereof, heating means adjacent said die beyond the feed end thereof for raising the contents of the die to coalescing temperature, and aerating means at the base of the hopper providing a plurality of upward, generally circumferentially directed lubricating air streams through said hopper.

2. Apparatus as set forth in claim 1 wherein said aerating means provides a plurality of inner and outer counter-rotating air streams.

3. Apparatus as set forth in claim 1 including die loading means comprising a conduit within said hopper having at least one opening directed generally at the feed end of the die, said conduit communicating with a source of air under pressure.

4. Apparatus as set forth in claim 3 including die cooling means intermediate said heating means and the feed end of said die.

5. Apparatus as set forth in claim 1 including die loading means comprising a manifold member within said hopper, a plurality of passageways joining the interior of the manifold with its exterior surface facing the feed end of the die, and conduit means joining the interior of said manifold with a source of air under pressure.

6. Apparatus as set forth in claim 1 including die loading means comprising a tubular member disposed axially of the ram in substantial alignment with the die, said member being adapted to reciprocate through the powder hopper, means for advancing said member through said hopper in the direction of the die at a speed sufficient to enable it to fill substantially with powder, means for stopping the forward motion of said member just short of said die, means for withdrawing said member and means for activating the advancing means therefor.

7. Apparatus as set forth in claim 6 including die cooling means intermediate said heating means and the feed end of said die.

8. Apparatus as set forth in claim 1 including die loading means comprising a reciprocating tubular member positioned axially of the ram and of cross-section corresponding to that of the die, means responsive to the position of the ram for rapidly advancing said member through the powder hopper, means for stopping said member just short of the die, and means responsive to the position of the ram for withdrawing said member from its forward position.

9. Apparatus as set forth in claim 1 including at least one axially movable mandrel extending through the tip of the ram, through the powder hopper and into the die, said mandrel being free to advance into said die under pressure of the forward stroke of the ram a distance at least equal to the length of product forced from the die, and means for retracting said mandrel an equivalent distance prior to retraction of the ram.

10. Apparatus as set forth in claim 1 including at least one axially movable mandrel extending through the tip of the ram, through the powder hopper and into the die, and means for advancing said mandrel a distance at least equal to the length of product forced from the die by the forward stroke of the ram, and for retracting said mandrel an equivalent distance.

11. Apparatus as set forth in claim 10 wherein the mandrel advancing and retracting means are independent of the means whereby the ram is reciprocated.

12. Apparatus for the dry powder ram extrusion of polytetrafluoroethylene powder articles which comprises in combination a powder hopper, a die associated therewith, heating means adjacent said die beyond the feed end thereof adapted to raise a portion of the die to polytetrafluoroethylene coalescing temperature, a reciprocating ram adapted to enter said die, an aerator, means connecting said aerator to a source of air under pressure, said aerator having a plurality of upwardly directed passageways connecting its interior with the upper surface thereof, the exits of said passageways being arranged so as to provide a plurality of exits adjacent the periphery of said aerator and a plurality of exits intermediate the outer exits and the center axis of said aerator, and means for directing the air streams from said exits tangentially inwardly.

13. Apparatus as set forth in claim 12 wherein the exits of said passageways are so directed as to produce counter-rotating upward, circumferentially moving air streams.

14. Apparatus for the dry powder ram extrusion of polytetrafluoroethylene powder articles which comprises in combination a powder hopper, a die with access to said hopper, heating means adjacent said die beyond the feed end thereof adapted to raise a portion of the die to polytetrafluoroethylene coalescing temperature, a cooling jacket about said die intermediate said heating means and the feed end of said die, a reciprocating ram adapted to enter said die and an aerator in the base of said hopper for creating a dispersed upward flow of air through the material therein, comprising a manifold member having a plurality of outer upwardly directed passageways connecting the interior of said manifold with the upper surface thereof, said passageways arranged adjacent the periphery of said manifold member, the upper surface of said manifold member being adapted to provide an exit channel for each of said outer passageways, said manifold also having a plurality of inner upwardly directed passageways similarly connecting the interior and the upper surface of said manifold member arranged intermediate the center of said member and said outer passageways, the upper surface of said member being adapted to provide an inwardly directed exit channel for each of said passageways, said inner and outer channels being arranged so as to provide inner and outer counter rotating air streams.

15. Apparatus for the dry powder ram extrusion of polytetrafluoroethylene articles which comprises in combination a powder hopper, a die with access to said hopper, heating means adjacent said die beyond the feed end thereof adapted to raise a portion of the die to polytetrafluoroethylene coalescing temperature, die cooling means about said die intermediate said heating means and the feed end of said die, a reciprocating ram adapted to enter said die, and an aerator in the base of said hopper comprising a disc-shaped manifold member having at least one outer upwardly directed passageway adjacent its periphery connecting the interior of said manifold with the upper surface thereof, said manifold also having at least one inner upwardly directed passageway similarly connecting the interior with the upper surface of said manifold member, the said inner passageway arranged intermediate the center of said manifold member and the said outer passageway, adapted to provide inwardly directed exit channels for the said inner and outer passageways respectively, said inner and outer channels being arranged so as to provide counter rotating gas streams.

16. A process for producing polytetrafluoroethylene articles by dry powder extrusion, which comprises periodically so introducing a plurality of circumferentially directed air streams upwardly through a bed of polytetrafluoroethylene powder with sufficient force to create a violent turbulence in the bed which reduces the bulk density of the powder, breaks up agglomerates and thoroughly lubricates the powder, periodically positively introducing a portion of the thus lubricated powder to an extrusion die, having a preform zone adjacent its feed end and a heating zone beyond said preform zone, against a previously compacted slug, compressing the powder introduced under pressure of an advancing ram and advancing the previously compacted slug a given distance through said die, then releasing ram pressure on the material in the die, while heating compacted slugs of powder in the heating zone to at least polytetrafluoroethylene coalescing temperatures.

17. A process as set forth in claim 16 including positively cooling at least a portion of the material in the preform zone.

18. A process as set forth in claim 17 wherein the portion of material in the preform zone is so cooled as to maintain it at substantially room temperature.

19. A process as set forth in claim 16 wherein the plurality of upwardly directed air streams comprise outer and inner groups of generally circumferentially directed air streams.

20. A process as set forth in claim 16 wherein the plurality of upwardly directed air streams comprise outer and inner oppositely moving generally circumferentially directed air streams.

21. A process as set forth in claim 16 wherein the lubricated powder is introduced to the extrusion die by a periodic blast of air directed generally transversely through the bed of powder at the feed end of the die.

22. A process as set forth in claim 16 wherein introduction of lubricated powder to the extrusion die follows introduction of the circumferentially directed air streams upwardly through the bed of powder.

23. A process as set forth in claim 16 for producing polytetrafluoroethylene tube which comprises advancing a mandrel a given distance into said die during compacting of the powder therein, and withdrawing the same an equivalent distance just prior to the release of ram pressure.

References Cited in the file of this patent

UNITED STATES PATENTS

| | | |
|---|---|---|
| 1,455,946 | Wester | May 22, 1923 |
| 1,751,624 | Du Brul | Mar. 25, 1930 |
| 2,080,783 | Petersen | May 18, 1937 |
| 2,409,521 | Wiley | Oct. 15, 1946 |
| 2,528,260 | Cademartori | Oct. 31, 1950 |
| 2,712,693 | Comparette | June 12, 1955 |
| 2,742,669 | Rhodes | Apr. 24, 1956 |
| 2,870,486 | Wagner | Jan. 27, 1959 |

FOREIGN PATENTS

| | | |
|---|---|---|
| 881,013 | Germany | June 25, 1953 |
| 644,477 | Great Britain | Oct. 11, 1950 |
| 665,418 | Great Britain | Jan. 23, 1952 |

OTHER REFERENCES

Information Bulletin No. X-52, "Teflon Ram Extrusion," E. I. du Pont de Nemours & Co., Wilmington, Delaware, Nov. 15, 1954, pages 1-7.

"Fluorothene Wire Insulation," Modern Plastics, vol. 30, No. 4, December 1952, pages 130, 186 and 188.